US012805664B2

(12) United States Patent
Graham et al.

(10) Patent No.: US 12,805,664 B2
(45) Date of Patent: Nov. 24, 2026

(54) COOKING STATION AND GRIDDLE WITH UNDERSTRUCTURE AND METHOD THEREOF

(71) Applicant: North Atlantic Imports, LLC, Logan, UT (US)

(72) Inventors: Gary E. Graham, Hyde Park, UT (US); Jared M. Smith, Paradise, UT (US); Adam S. Dexter, Wellsville, UT (US); James C. Bush, III, Providence, UT (US); Scott W. M. Stevenson, Smithfield, UT (US); Karrie P. Kunz, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 386 days.

(21) Appl. No.: 18/645,316

(22) Filed: Apr. 24, 2024

(65) Prior Publication Data

US 2024/0374082 A1 Nov. 14, 2024

Related U.S. Application Data

(63) Continuation-in-part of application No. 17/725,630, filed on Apr. 21, 2022, now Pat. No. 12,642,389.

(60) Provisional application No. 63/461,397, filed on Apr. 24, 2023, provisional application No. 63/272,799, filed on Oct. 28, 2021, provisional application No. 63/178,434, filed on Apr. 22, 2021.

(51) Int. Cl.
*A47J 37/07* (2006.01)

(52) U.S. Cl.
CPC ....... *A47J 37/0704* (2013.01); *A47J 37/0786* (2013.01)

(58) Field of Classification Search
CPC .. A47J 37/067; A47J 37/0786; A47J 37/0704; A47J 37/0682
See application file for complete search history.

(56) References Cited

U.S. PATENT DOCUMENTS

| | | | |
|---|---|---|---|
| 1,201,138 | A | 10/1916 | Bingham |
| 1,351,682 | A | 8/1920 | Popper |
| 1,447,813 | A | 3/1923 | Patrick |

(Continued)

FOREIGN PATENT DOCUMENTS

| | | |
|---|---|---|
| IT | 20130097 | 12/2014 |

OTHER PUBLICATIONS

International Search Report dated Aug. 1, 2022 for International Application No. PCT/US2022/071848 (14 pages).

*Primary Examiner* — Alfred Basichas
(74) *Attorney, Agent, or Firm* — Foley & Lardner LLP

(57) ABSTRACT

A system, device and method of a griddle with structure configured to minimize the effects of thermal stress and strain. The griddle extends to define a flat cooking surface and an oppositely facing underside surface. The underside surface extends to define a front end, a rear end, a first end, and a second end, the front end extending parallel with the rear end, the first end extending parallel with the second end. The underside surface includes diagonal reinforcement portions secured thereto such that the diagonal reinforcement portions are elongated and longitudinally extend transverse along the underside surface relative to each of the front end, the rear end, the first end and the second end of the underside surface of the griddle. Further, the reinforcement portions may include a central plate positioned over a seam or intersection of the reinforcement portions.

28 Claims, 21 Drawing Sheets

(56) References Cited

U.S. PATENT DOCUMENTS

| | | | |
|---|---|---|---|
| 3,034,419 | A | 5/1962 | Hillegrand et al. |
| 4,715,356 | A | 12/1987 | Reynolds |
| 5,349,899 | A | 9/1994 | Tominaga et al. |
| 5,619,910 | A | 4/1997 | Farnsworth et al. |
| 5,676,043 | A | 10/1997 | Best |
| 5,957,123 | A | 9/1999 | Addonizio, Jr. et al. |
| 6,109,504 | A | 8/2000 | Groll |
| 6,138,554 | A | 10/2000 | McFadden et al. |
| 6,389,960 | B1 | 5/2002 | Williams et al. |
| 7,340,994 | B2 | 3/2008 | Bruno et al. |
| 7,348,519 | B2 | 3/2008 | Federspiel et al. |
| D604,098 | S | 11/2009 | Hamlin |
| 8,037,602 | B2 | 10/2011 | Huang |
| D694,056 | S | 11/2013 | Dahle |
| 9,119,500 | B2 | 9/2015 | Hamlin |
| 10,660,473 | B2 | 5/2020 | Dahle et al. |
| 2006/0016348 | A1 | 1/2006 | Babington |
| 2008/0223359 | A1 | 9/2008 | Huang |
| 2009/0101024 | A1 | 4/2009 | Button |
| 2010/0083949 | A1 | 4/2010 | Lisheng |
| 2010/0199857 | A1 | 8/2010 | Storiz et al. |
| 2014/0161952 | A1 | 6/2014 | Sykes |

COOKING STATION AND GRIDDLE WITH UNDERSTRUCTURE AND METHOD THEREOF

CROSS-REFERENCE TO RELATED APPLICATIONS

This application claims the benefit of U.S. Provisional Application No. 63/461,397, filed Apr. 24, 2023, the disclosure of which is hereby incorporated by reference herein in its entirety. Further, this application is a continuation-in-part of U.S. patent application Ser. No. 17/725,630, filed on Apr. 21, 2022, which claims the benefit of U.S. Provisional Application No. 63/272,799, filed Oct. 28, 2021, and U.S. Provisional Application No. 63/178,434, filed Apr. 22, 2021, the disclosures of which are hereby incorporated by reference herein in their entirety.

TECHNICAL FIELD

The present invention relates generally to cooking stations and, more specifically, the present invention relates to structure for griddles to resist the effects of thermal stress and strain on such griddles.

BACKGROUND

Barbequing has become a popular and pervasive tradition in much of the world. A barbeque grill is a device for cooking food by applying heat directly below a grill cooking surface. Another preferred cooking surface is a griddle due to the larger variety of foods one is able to cook over its cooking surface. A griddle is a cooking device having a broad flat cooking surface that is typically heated by being placed directly on a grill or over flame burners and is used in both residential and commercial applications for a variety of cooking operations. Some griddles are also heated using electrical elements. The griddle is most commonly a flat metal plate composed of cast or wrought iron, aluminum or carbon steel.

An issue found with griddles is that over time griddles have a tendency to warp due to the repeated thermal stress and strain placed on the griddle. This issue can be accelerated depending on how the griddle is used when heated at high temperatures. For example, when a hot griddle receives cold food or water on the cooking surface, the metal is cooled quickly at the surface. This causes the metal along the cooking surface to contract more than the metal along the bottom surface of the griddle, typically kept hot over flame burners, for example. These types of uses with the griddle may cause thermal fatigue and cause the griddle to warp.

BRIEF SUMMARY OF THE INVENTION

The present invention is directed to devices, systems and methods for minimizing the effects of thermal stress and thermal strain on a griddle. In one embodiment, a main body and a griddle are provided. The main body extends to define a front side, a rear side, a left side and a right side each extending between a lower end and an upper portion. Further, the main body includes multiple heating elements supported by the main body and coupled to the upper portion of the main body. The griddle is sized and configured to be removably positioned over and supported by the main body, the griddle including a flat cooking surface and an oppositely facing underside surface. The underside surface extends to define a front end, a rear end, a left end and a right end, the front end extending parallel with the rear end, the left end extending parallel with the right end. Further, the underside surface of the griddle includes diagonal reinforcement portions that extend to exhibit an x-configuration such that the diagonal reinforcement portions extend longitudinally so as to extend transverse along the underside surface relative to each of the front end, the rear end, the left end and the right end of the underside surface of the griddle. The x-configuration defines a central intersection, the central intersection having a central plate coupled directly to the central intersection of the x-configuration.

In another embodiment, the central plate extends substantially parallel with the underside surface of the griddle. In another embodiment, the central plate includes a plate opening defined therein, the plate opening of the central plate configured to be positioned over the central intersection.

In another embodiment, the underside surface of the griddle includes a front support structure, a left support structure and a right support structure, the front support structure secured to the underside surface and extending parallel with the front end, the left and right support structures secured to the underside surface and extending adjacently along the respective left and right ends, the front support structure including holes defined therein. In another embodiment, the griddle includes griddle legs extending from the underside surface of the griddle, the griddle legs configured to directly engage an upper surface of the upper portion of the main body, the griddle legs configured to suspend the underside surface of the griddle above the upper surface of the main body such that the front support structure extends further from the underside surface than the griddle legs so that, upon the griddle being positioned on the main body, the front support structure extends below the upper surface of the main body. In another embodiment, the holes defined in the front support structure are sized and configured to view the multiple heating elements below the griddle. In still another embodiment, the underside surface of the griddle includes a rear support structure with openings defined therein, the rear support structure configured to minimize wind from entering below the griddle and the openings sized and configured to facilitate heat to exit below the griddle.

In another embodiment, the diagonal reinforcement portions extend from the underside surface of the griddle, the diagonal reinforcement portions having a lateral extension adjacent an end of each of the diagonal reinforcement portions. In still another embodiment, the lateral extension extends along most of a length of the diagonal reinforcement portions.

In another embodiment, the griddle includes a front reinforcement piece, a rear reinforcement piece, a left reinforcement piece, and a right reinforcement piece, each of the front, rear, left and right reinforcement pieces secured to the underside surface of the griddle and positioned between two of the diagonal reinforcement portions, the front and rear reinforcement pieces positioned to extend substantially parallel with both the front and rear ends of the underside surface, the left and right reinforcement pieces positioned to extend substantially parallel with left and right ends of the underside surface. In yet another embodiment, the diagonal reinforcement portions each comprise multiple openings defined therein, the multiple openings sized and configured to facilitate convective heat to flow therethrough.

In accordance with another embodiment of the present invention, a griddle configured to minimize the effects of thermal stress is provided. The griddle includes a flat cooking surface and an underside surface. The flat cooking surface extends to define a periphery and a splash guard, the splash guard extending upward from the periphery of the flat cooking surface. The underside surface faces opposite of the flat cooking surface, the underside surface extending to define a front end, a rear end, a left end and a right end. The front end extends parallel with the rear end, and the left end extends parallel with the right end. The underside surface includes diagonal reinforcement portions that extend to exhibit an x-configuration such that the diagonal reinforcement portions extend longitudinally so as to extend transverse along the underside surface relative to each of the front end, the rear end, the left end and the right end of the underside surface of the griddle. The x-configuration defines a central intersection, the central intersection having a central plate coupled directly to the central intersection of the x-configuration.

In another embodiment, the central plate extends substantially parallel with the underside surface of the griddle. In another embodiment, the central plate includes a plate opening defined therein, the plate opening of the central plate configured to be positioned over the central intersection.

In another embodiment, the underside surface of the griddle includes a front support structure, a left support structure and a right support structure, the front support structure secured to the underside surface and extending parallel with the front end, the left and right support structures secured to the underside surface and extending adjacently along the respective left and right ends, the front support structure including holes defined therein. In another embodiment, the griddle includes griddle legs extending from the underside surface of the griddle such that the front support structure extends further from the underside surface than the griddle legs.

In another embodiment, the underside surface of the griddle includes a rear support structure with openings defined therein, the rear support structure configured to minimize wind from entering below the griddle and the openings sized and configured to facilitate heat to exit through the openings defined in the rear support structure. In another embodiment, the diagonal reinforcement portions extend from the underside surface of the griddle, the diagonal reinforcement portions having a lateral extension adjacent an end of each of the diagonal reinforcement portions. In still another embodiment, the lateral extension extends along most of a length of the diagonal reinforcement portions.

In another embodiment, the griddle includes a front reinforcement piece, a rear reinforcement piece, a left reinforcement piece, and a right reinforcement piece, each of the front, rear, left and right reinforcement pieces secured to the underside surface of the griddle and positioned between two of the diagonal reinforcement portions, the front and rear reinforcement pieces positioned to extend substantially parallel with both the front and rear ends of the underside surface, the left and right reinforcement pieces positioned to extend substantially parallel with left and right ends of the underside surface. In yet another embodiment, the diagonal reinforcement portions each includes multiple openings defined therein, the multiple openings sized and configured to facilitate convective heat to flow therethrough.

In accordance with another embodiment of the present invention, a method for minimizing effects of thermal stress to a griddle is provided. The method steps include positioning a griddle over an upper side of a main body of cooking station such that the griddle includes a cooking surface and an oppositely facing underside surface, the underside surface extending to define a front end, a rear end, a left end and a right end, the front end extending parallel with the rear end, the left end extending parallel with the right end; igniting one or more heating elements below the griddle and within a base frame of the cooking station; and heating the underside surface of the griddle such that the underside surface of the griddle includes a reinforcement structure directly secured thereto, the reinforcement structure extending to define diagonal reinforcement portions that extend to exhibit an x-configuration so as to define a central intersection of the x-configuration, the central intersection having a central plate coupled over the central intersection of the x-configuration.

In another embodiment, the step of heating includes funneling heat rearwardly along the underside surface of the griddle with a front support structure positioned along the front end and left and right support structures positioned adjacently along the left and right ends, respectively, such that the diagonal reinforcement portions define multiple openings along a length of the diagonal reinforcement portions so that heat moves rearwardly therethrough. In another embodiment, the method further includes viewing the one or more heating elements through holes defined in the front support structure.

In another embodiment, the step of funneling heat rearwardly includes funneling heat through rear vent openings defined in a rear support structure positioned along the rear end of the underside surface of the griddle. In still another embodiment, the step of funneling heat through the rear vent openings includes blocking wind from flowing between the griddle and the upper side of the main body with the rear support structure along a rear side of the griddle such that the rear vent openings are positioned and sized to facilitate funneling heat from below the griddle so that a remaining structure of the rear support structure sufficiently blocks wind. In another embodiment, the step of funneling heat rearwardly includes blocking wind from flowing between the griddle and the upper side of the main body with the front support structure along a front side of the griddle, and with the left support structure along a left side of the griddle, and with the right support structure along a right side of the griddle. In another embodiment, the step of heating includes heating the underside surface of the griddle with the central plate having a plate hole positioned over the central intersection.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
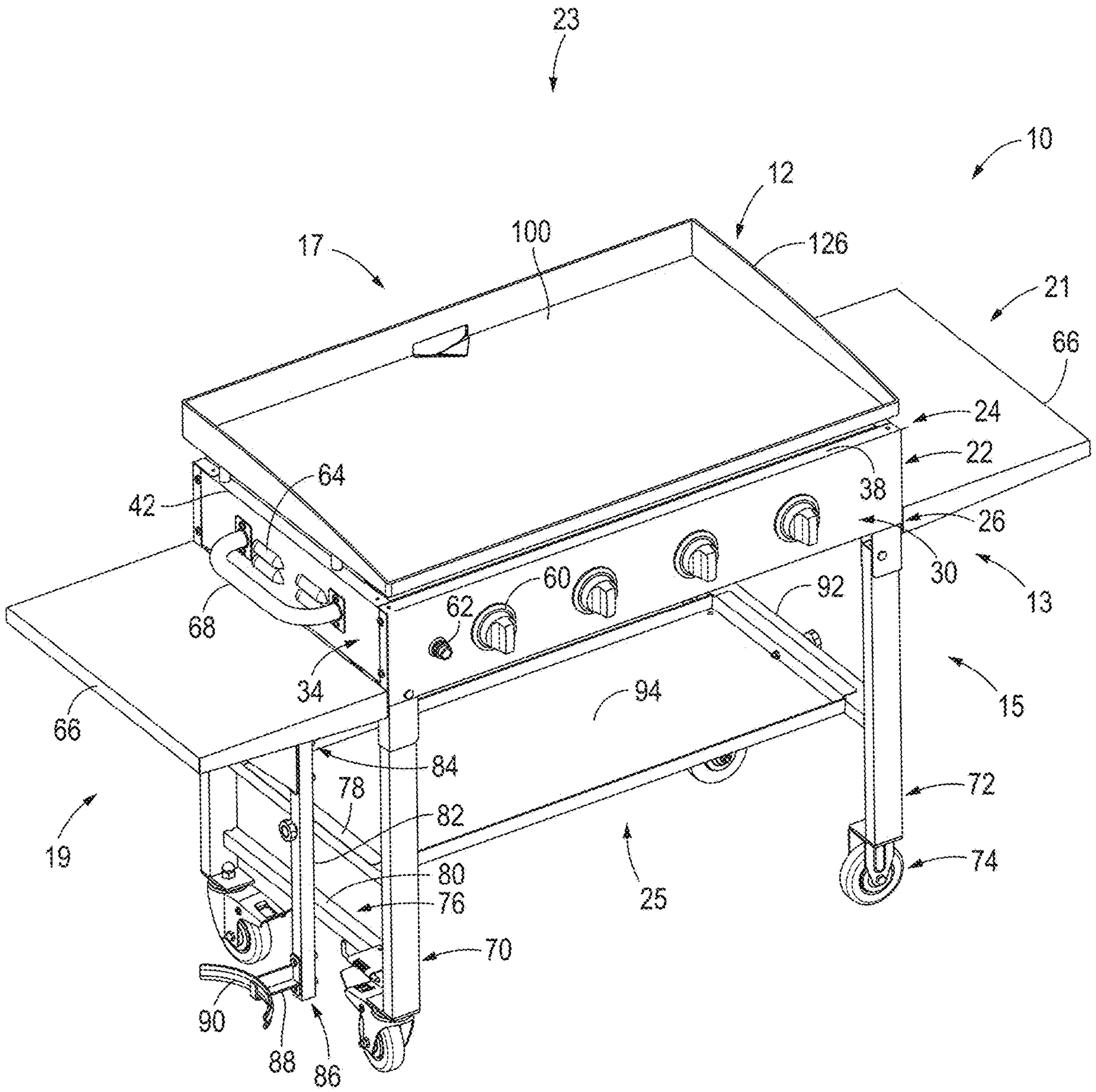
FIG. 1 is a perspective view of a cooking station with a griddle, according to one embodiment of the present invention.
Figure 2:
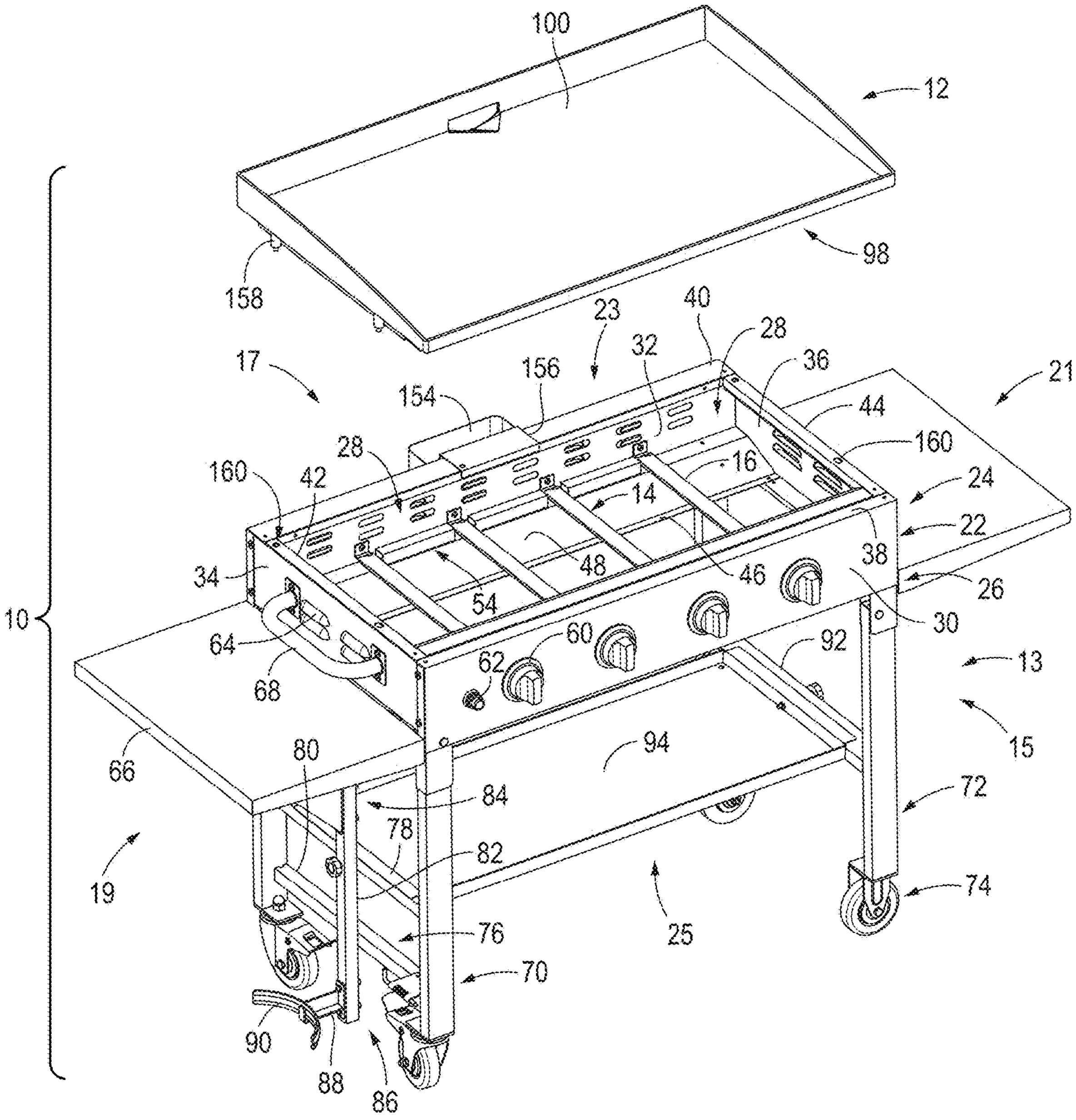
FIG. 2 is an exploded view of the cooking station and the griddle, according to another embodiment of the present invention.

Referring to FIGS. 1 and 2, a cooking station 10 sized and configured to hold and support a griddle 12. The cooking station 10 may be an indoor or outdoor cooking station with a heating element 14. The heating element 14 may be gas flame burners 16 or any other suitable heating element 14, such as an electrical heating element, charcoal briquettes, lump charcoal, wood pellets or any other type of heating element. The gas flame burners 16 may be employed with propane or natural gas. The griddle 12 may be placed on the cooking station 10 above the gas flame burners 16 and may be heated by the gas flame burners 16, or any other heating element, as known in the art. As set forth in further detail herein, the griddle 12 may include various components and structure sized and configured to reduce or minimize the effects of thermal stress and thermal strain that may be produced in the griddle 12 through its normal intended function of cooking on the griddle 12. Such various components and structure may be referenced herein as an under-structure, a brace structure, or a reinforcement structure 18 (see, e.g., FIGS. 6 and 7).

The cooking station 10 may include a main body 13 with various frame components and panels sized and configured to support, among other things, the heating element 14 and the griddle 16. The frame components and panels of the main body 13 may extend to define a front side 15, a rear side 17, a left side 19, a right side 21, a top side 23 and a bottom side 25. The front side 15 may be opposite of the rear side 17 of the main body 13, and the left side 19 may be opposite of the right side 21 of the main body 13. Similarly, the top side 23 may be opposite of the bottom side 25 of the main body 13. For example, in one embodiment, the main body 13 of the cooking station 10 may include a base 22 with a top end 24 and a bottom end 26. The top end 24 may extend downwards to the bottom end 26. Further, the top end 24 and the bottom end 26 may be open to define an inner portion 28 of the base 22. The top end 24 of the base may extend to define a rectangular structure and may extend continuously to define a front side wall 30, a back side wall 32, a left side wall 34 and a right side wall 36. The front side wall 30, the back side wall 32, the left side wall 34 and the right side wall 36 may each extend inward with a width to define a respective front ledge 38, a back ledge 40, a left ledge 42 and a right ledge 44 above the inner portion 28 of the base 22. Such front, back, left and right ledges 38, 40, 42, and 44 may be referenced as an upper surface of the base 22 or the main body 13 of the cooking station 10. The back ledge 40 and the front ledge 38 may extend inwardly to a larger extant than that of the left ledge 42 and the right ledge 44. The bottom end 26 of the base 22 may extend to generally correspond with the top end 24. The left and right side walls 34, 36 may extend inward with a width along the bottom end 26. The bottom end 26 may also include a bottom floor 46. The bottom floor 46 may be located in the inner portion 28 of the base 22 and have a back side bottom floor 48 and front side bottom floor 50. The back side and front side bottom floors 48, 50 may be coupled to the back side wall 32 and the front side wall 30 respectively. Further, the back side and front side bottom floors 48, 50 may be similar in their description, the bottom floors 46 may extend along the entire length of either the front or back side walls 30, 32. The bottom floor 46 may extend inwards and be level before extending at an angle downwards. The bottom floor 46 may meet and be coupled to the width of the bottom end 26 of the left and right side walls 34, 36. Further, the bottom floor 46 may leave an open space 52 between the back side bottom floor 48 and front side bottom floor 50. Such open space 52 may be sized and configured to allow for appropriate air flow to the heating element 14 within the base 22.

In another embodiment, the base 22 may include one or more gas flame burners 16 that may be sized and configured to be placed in the inner portion 28 of the base 22 such that the base 22 or main body may support the gas flame burners 16. Such inner portion 28 of the base 22 or the main body 13 may be referenced as a fire box since the inner portion 28 holds the one or more gas flame burners 16. The gas flame burners 16 may extend from the front side wall 30 to the back side wall 32 and may be attached to a gas line (not shown) that may facilitate the flow of gas, such as propane or natural gas, through the gas line from a pressurized gas source (not shown), such as a propane tank or other gas source, to the gas flame burners 16, as known to one of ordinary skill in the art. In another embodiment, the burners 16 may extend from an inner wall (not shown) that may be slightly rearward of the front side wall 30 to provide a gap therebetween and act as a heat shield so there is separation between the burners 16 and the components associated with the control panel or front side wall 30.

As previously set forth, the front side wall 30 may include one or more burner knobs 60 that may be manually turned to control the amount of gas flowing to the gas flame burners 16. Moreover, the burner knobs 60 may correspond to the gas flame burner 16 placed directly behind the respective burner knob 60. The burner knobs 60 may block as well as control the amount of gas flowing from the gas source to the gas flame burners 16. Further, the front side wall 30 may include an ignition switch 62. The ignition switch 62 may ignite the gas to create a flame at the gas flame burners 16 when the burner knob 60 is turned to allow the gas from the gas source into the gas flame burner 16. In a further embodiment, the back side wall 32, the left side wall 34 and the right side wall 36 of the base 22 may each include multiple vents 64 defined therein. The vents 64 may be elongated and may be positioned to occur in multiples along the entire length of the corresponding side. Further, the vents 64 may be configured in such a way to minimize air flow into the base due to windy conditions while also supplying oxygen for burning gas at the gas flame burners 16. In some embodiments, the left side wall 34 and/or the right side wall 36 may include a side shelf 66 coupled thereto. Such side shelf 66 on one or both sides of the cooking station 10 may assist the user in managing the cooking space, such that food product and cooking utensils may be placed on the side shelf 66, while cooking at the cooking station 10. Further, the left side wall 34 may contain a handle 68 positioned to assist in the portability of the cooking station 10.

In a further embodiment, the base 22 may have two left side legs 70 and two right side legs 72 that may extend downward away from the bottom end 26 of the base 22. The left side legs 70 and the right side legs 72 may be coupled to the bottom end 26 of the base 22 and may have casters 74 at one end of the left side legs 70 and right side legs 72. Further, in another embodiment, the left side legs 70 and right side legs 72 may be collapsible and may be folded towards the opposite end of the base 22, either the right side wall 36 or left side wall 34, and into the bottom end 26 of the base 22. In this manner, the left side legs 70 and right side legs 72 may be collapsible to allow the cooking station 10 the ability to be stored in smaller spaces and to be portable. In another embodiment, the left side legs 70 may have two stationary bars 76 between the left side legs 70, the stationary bars 76 may be coupled to the left side legs 70 and may be a top bar 78 and a bottom bar 80. The top bar 78 may have a removable perpendicular bar 82 extending upwards to a first end 84 and downwards to a second end 86. The second end 86 of the perpendicular bar 82 may have a short bar 88 coupled to a half circle structure 90 that extends outward relative to bar 82. The half circle structure 90 may be sized and configured to hold a propane tank (not shown), for example. The right side legs 72 may have one stationary bar 76, such as a right stationary bar 92. The top bar 78 and right stationary bar 92 may be the same height and may have a bottom shelf 94 that may be placed between the top bar 78 and right stationary bar 92. The bottom shelf 94 may extend with a rectangular structure and may be positioned under the base 22. Further, the bottom shelf 94 may assist in keeping the left side legs 70 and right side legs 72 from collapsing inwards. Even further, the bottom shelf 94 may be removed to allow the left side legs 70 and right side legs to collapse 72. The casters 74 may allow the cooking station 10 to be portable when it is fully expanded. Further, the casters 74 of the left side leg 70 may have brakes to keep the cooking station 10 from moving.

Figure 3:
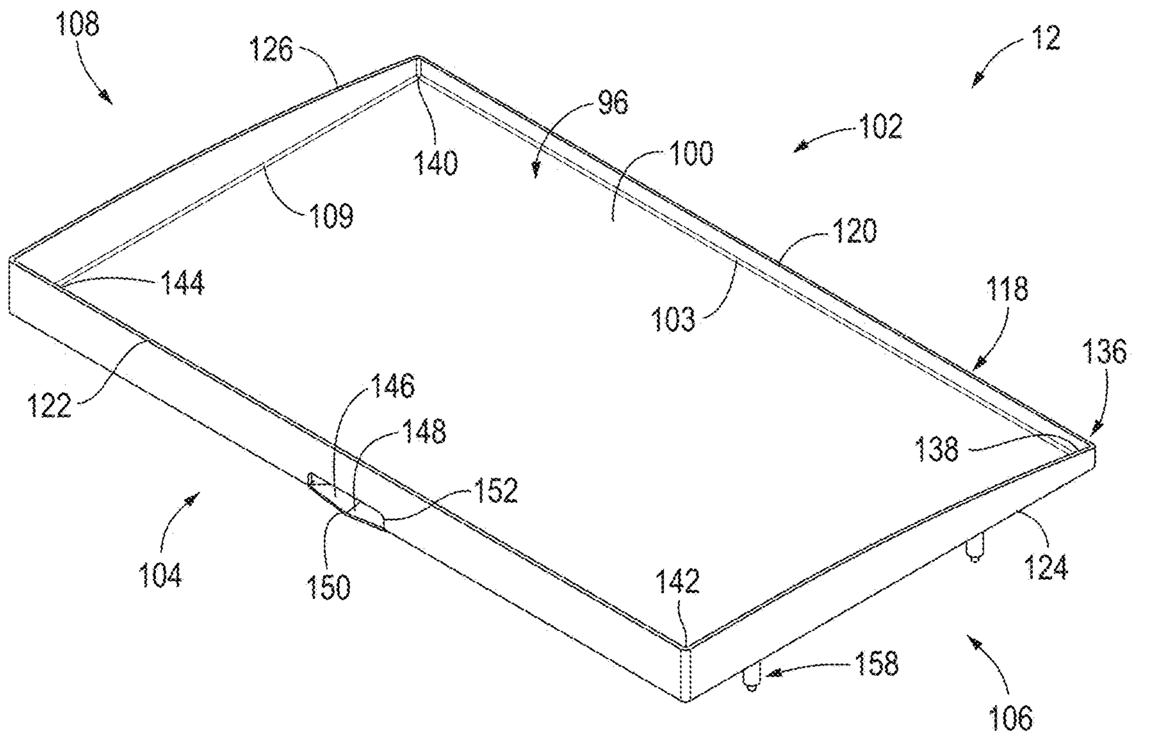
FIG. 3 is a rear-top perspective view of the griddle, according to another embodiment of the present invention.
Figure 4:
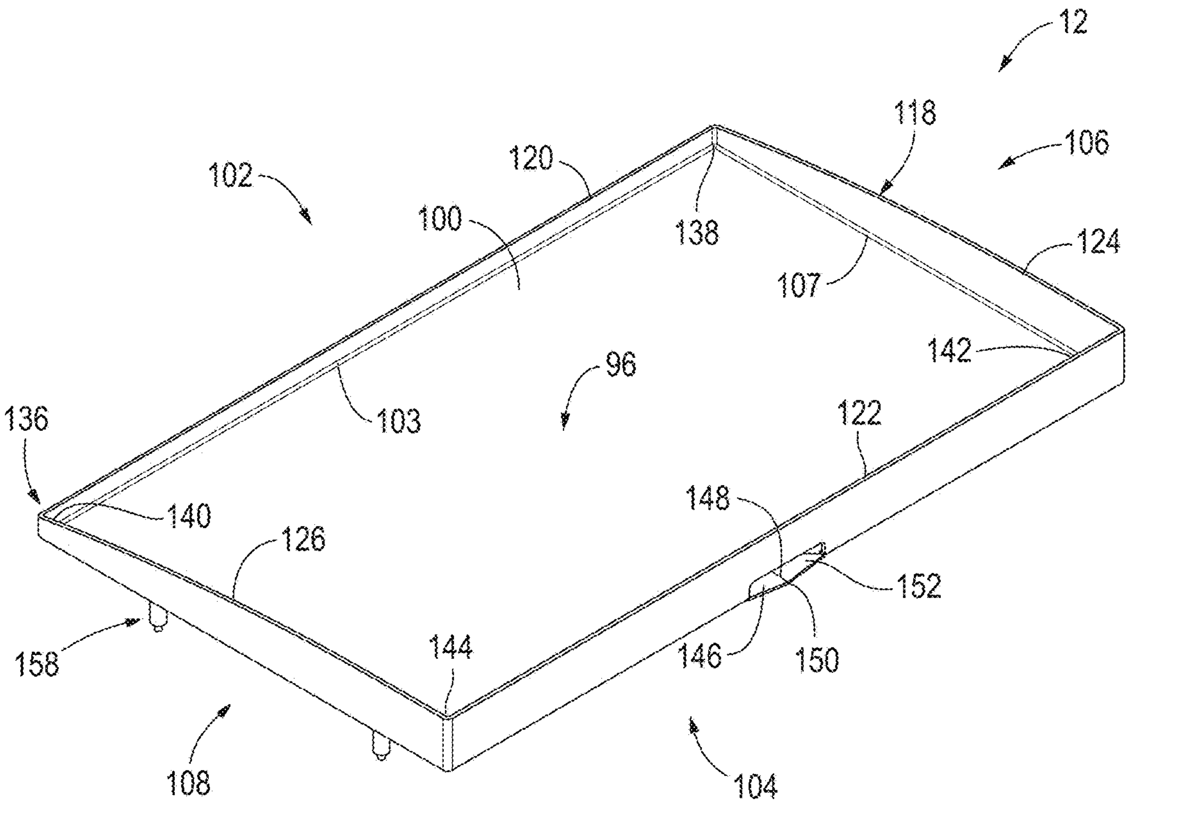
FIG. 4 is a rear-top perspective view of the griddle, according to another embodiment of the present invention.
Figure 5:
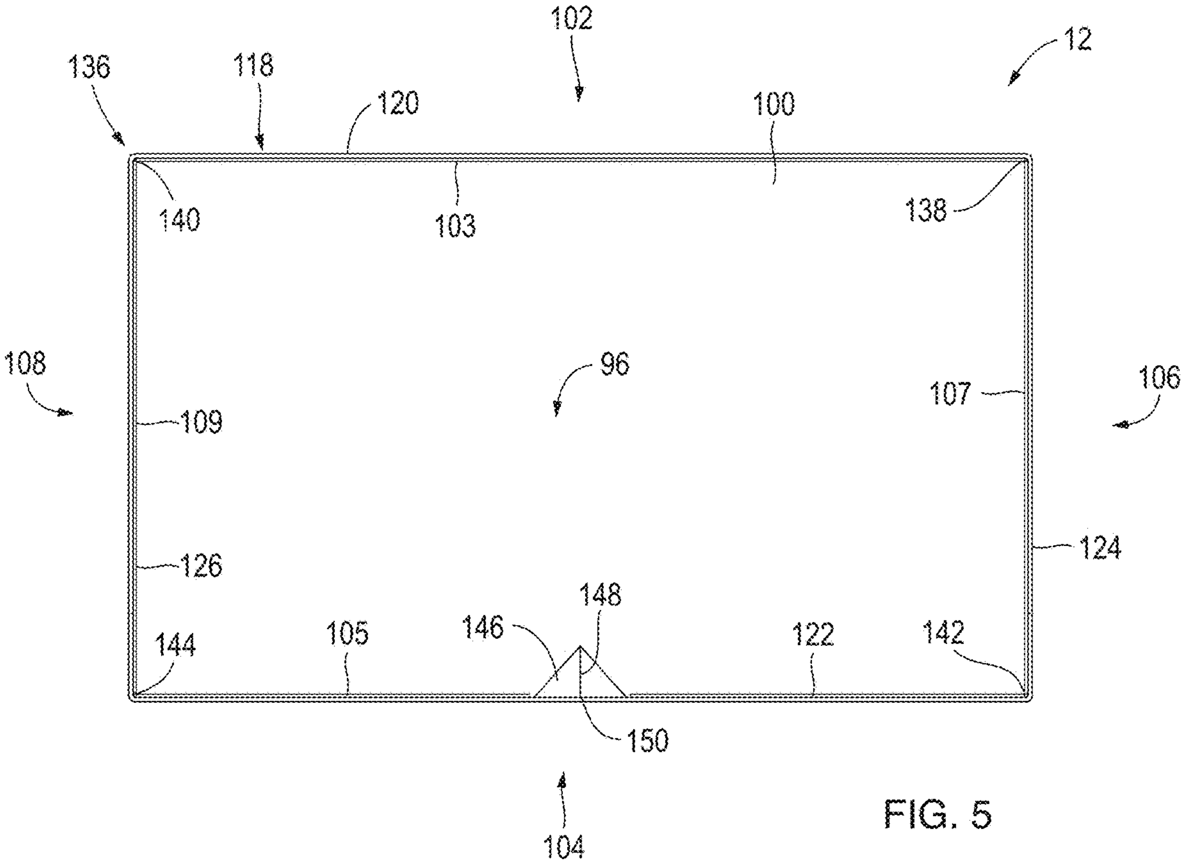
FIG. 5 is a top view of the griddle, according to another embodiment of the present invention.
Figure 6:
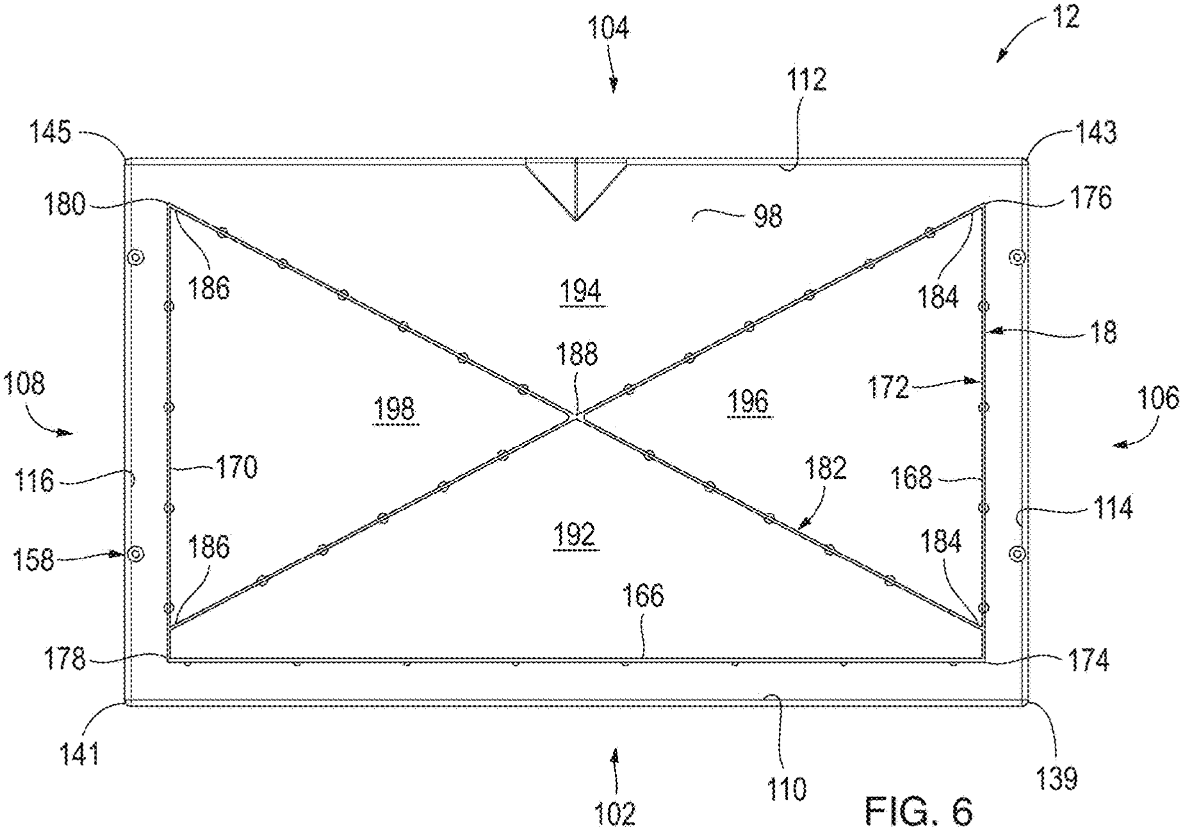
FIG. 6 is a bottom view of the griddle, depicting the griddle with a reinforcement structure secured thereto, according to another embodiment of the present invention.

Now with reference to FIGS. 3-5, as previously set forth, the griddle may be positioned over an upper side of the base 22 of the cooking station 10 (FIG. 1) such that the griddle may be oriented to define an upper side surface 96 and an underside surface 98 (FIG. 6). The griddle may be formed from a plate member with oppositely facing surfaces, namely, the upper side surface 96 and the underside surface 98. The upper side surface 96 may be a flat cooking surface 100. The flat cooking surface 100 may extend to define a rectangular shape so as to extend to define a front cooking end 103, a rear cooking end 105, a left cooking end 107, and a right cooking end 109. The front cooking end 103 may extend parallel relative to the rear cooking end 105. Similarly, the left cooking end 107 may extend parallel relative to the right cooking end 109. Further, the left and right cooking ends 107, 109 may also be referenced as first and second cooking ends, respectively. Also, the griddle 12 may extend to define a front side 102, a rear side 104, a left side 106, and a right side 108, which may correspond with the respective front cooking end 103, the rear cooking end 105, the left cooking end 107 and the right cooking end 109.

The upper side surface 96 of the griddle 12 may have a barrier 118 or wall extending upwards, which may also be referenced as a splash guard. The barrier 118 may have a height that may block grease splatters and may prevent grease overflow. The barrier 118 may extend continuously along a cooking surface periphery of the griddle 12 so as to define a front barrier 120, a rear barrier 122, a left barrier 124 and a right barrier 126 corresponding with the front side 102, the rear side 104, the left side 106 and the right side 108, respectively.

Further, the front barrier 120 may extend adjacently along the front cooking end 103 of the upper side surface 96 of the griddle 12 and may extend the entire length of the front cooking end 103. Further, the front barrier 120 may extend upwards and may have a height that may guard from grease spilling over. The height of the front barrier 120 may be lower than other heights of the rear barrier and the left and rear barriers 124, 126 so as to allow the user to comfortably cook. The rear barrier 122 may extend adjacent with the rear cooking end 105 of the upper side surface 96 of the griddle 12 and may extend the entire length of the rear cooking end 105. Further, the rear barrier 122 may extend upwards and may have a height that may block grease splatters and grease overflow. The height of the rear barrier 122 may extend taller than that of the front barrier 120. The left barrier 124 and the right barrier 126 may be similar in description. The left barrier 124 may extend between the front barrier 120 and the rear barrier 122. Similarly, the right barrier 126 may extend between the front barrier 120 and the rear barrier 122. The left barrier 124 and right barrier 126 may extend upwards and may have a height that may block grease splatters and grease overflow and, in some embodiments, the left and right barriers 124, 126 may taper in height. The barrier 118 may be coupled to the griddle 12 in such a way that the barrier 118 may be integrally formed together such that the barrier 118 may be a continuous body. The coupling of the barrier 118 may create corners 136 between the upper side surface 96 and the barrier 118. For example, the corners 136 may include a front left corner 138, a front right corner 140, a rear left corner 142 and a rear right corner 144. Further, the barrier 118 may be integrally formed to the flat cooking surface 100 such that the barriers 118 and the flat cooking surface 100 may be a continuous body.

The rear end 104 of the upper side surface 96 of the griddle 12 may define a sloped surface or a grease trough 146 positioned along the length of the rear end 104, such as a central position along the rear end 104. The grease trough 146 may be angled downwards to create an indentation 148 of the upper side surface 96, further, the indentation 148 may be angled downwards to create a drip edge 150. The rear barrier 122 may contain a slot 152 or opening defined along a bottom portion of the rear barrier 122 and along the length of the rear end 104. The slot 152 or opening may be positioned or formed in the rear barrier 122 so as to be positioned above the drip edge 150. The sloped surface and drip edge 150 may allow grease and food product to collect and pour out. Further, the user may be able to move unwanted grease and food product toward the grease trough 146 and away from the user.

With respect to FIG. 2, the cooking station 10 may include a grease container 154 configured to be positioned below the slot 152 defined in the griddle 12. For example, the grease container 154 may be positioned over the back side wall 32 of the base 22 and positioned under the slot 152 of the griddle. The container 154 may have a depth to allow liquid or other food product to drain and accumulate within the container 154. Moreover, the container 154 may have a u-shaped arm 156 that may extend above the container 154 to rest on the back side wall 32 and back ledge 40 of the base 22. In other embodiments, the container 154 may hang from the griddle 12. With this arrangement, the container 154 may be removably attached to the back side wall 32 of the base 22 and may be positioned below the drip edge 150 and slot 152 to allow the capture of released grease and food product from the griddle 12. As such, the container 154 may be removed to allow the user to discard the contents captured in the container 154.

Now with reference to FIGS. 6-13, the understructure or reinforcement structure 18 of the griddle 12 will now be described. With respect to FIG. 6, as previously set forth, the griddle 12 may extend to define an underside surface 98. The underside surface 98 may extend to a rectangular periphery so as to define a front end periphery 110, a rear end periphery 112, a left end periphery 114, and a right end periphery 116. The front end periphery 110 may be parallel with the rear end periphery 112. The left end periphery 114 may be parallel with the right end periphery 116. Further, the rectangular periphery of the underside surface 98 may extend to define four corners. For example, the front end periphery 110 of the underside surface 98 may extend between a front left corner 139 and a front right corner 141. The rear end periphery 112 may extend between a rear left corner 143 and a rear right corner 145. As such, the left end periphery 114 may extend between the front and rear left corners 139, 143 and the right end periphery 116 may extend between the front and rear right corners 141, 145.

Figure 7:
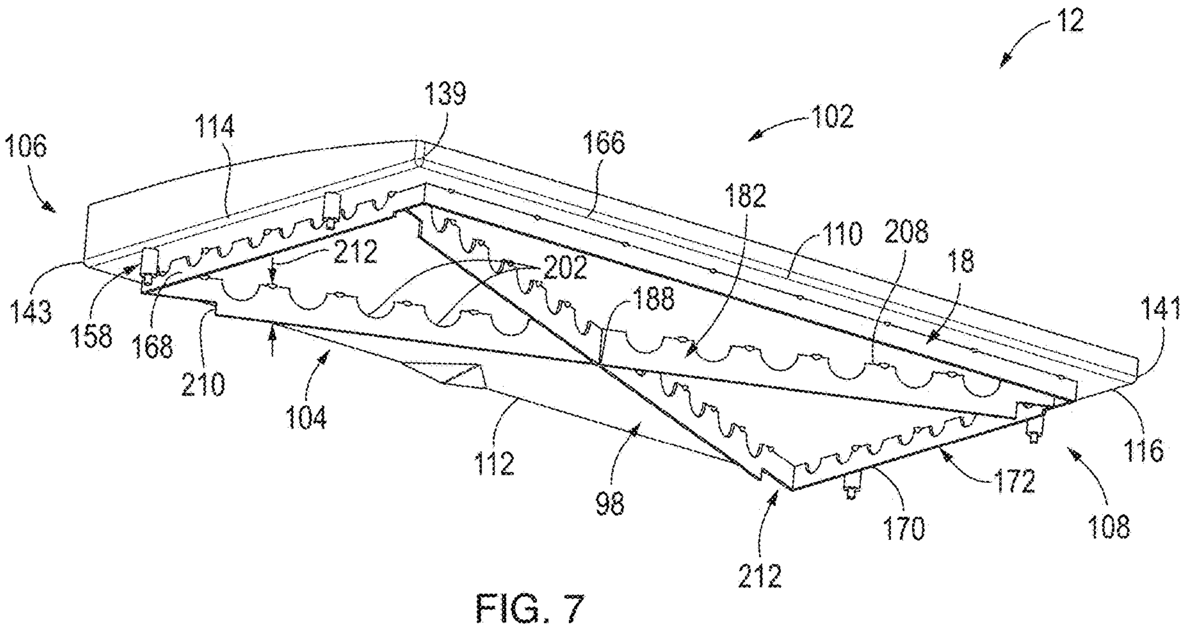
FIG. 7 is a bottom-front perspective view of the griddle, according to another embodiment of the present invention.
Figure 8:
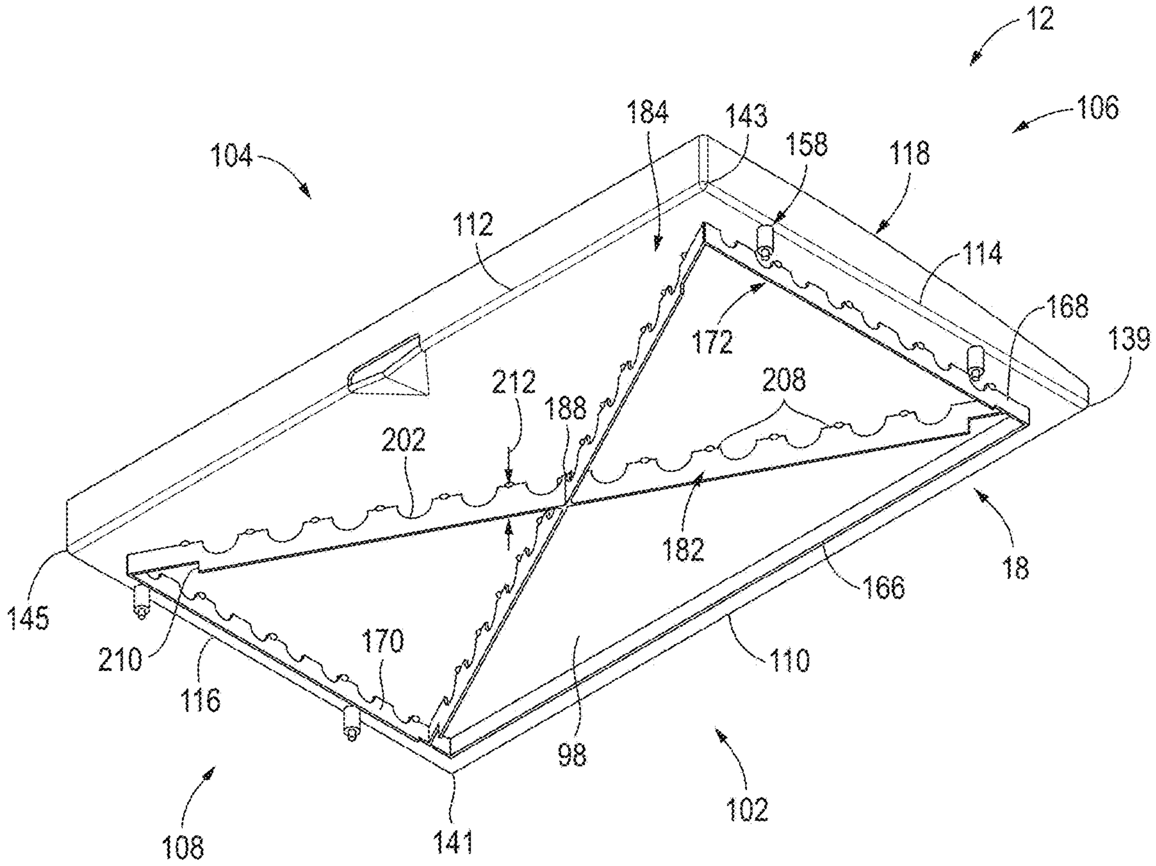
FIG. 8 is a bottom-rear perspective view of the griddle, according to another embodiment of the present invention.
Figure 9:
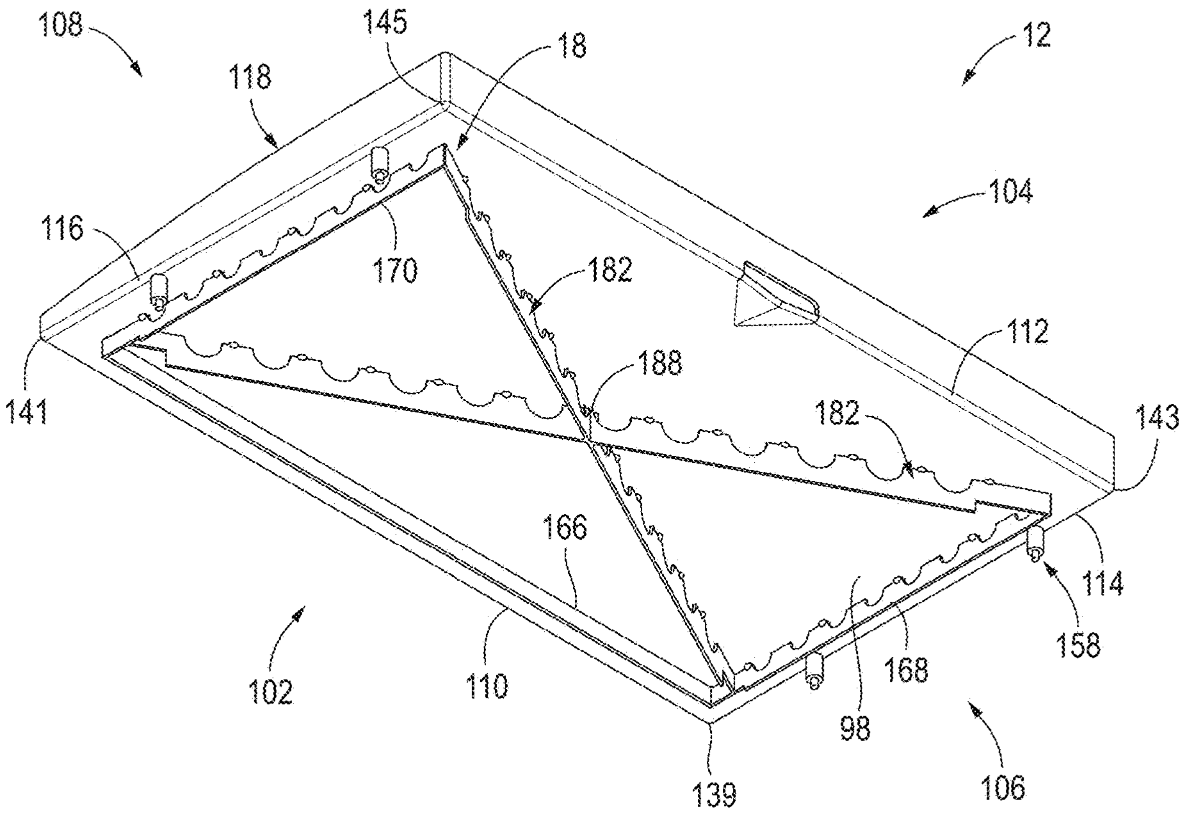
FIG. 9 is another bottom-rear perspective view of the griddle, according to another embodiment of the present invention.
Figure 10:
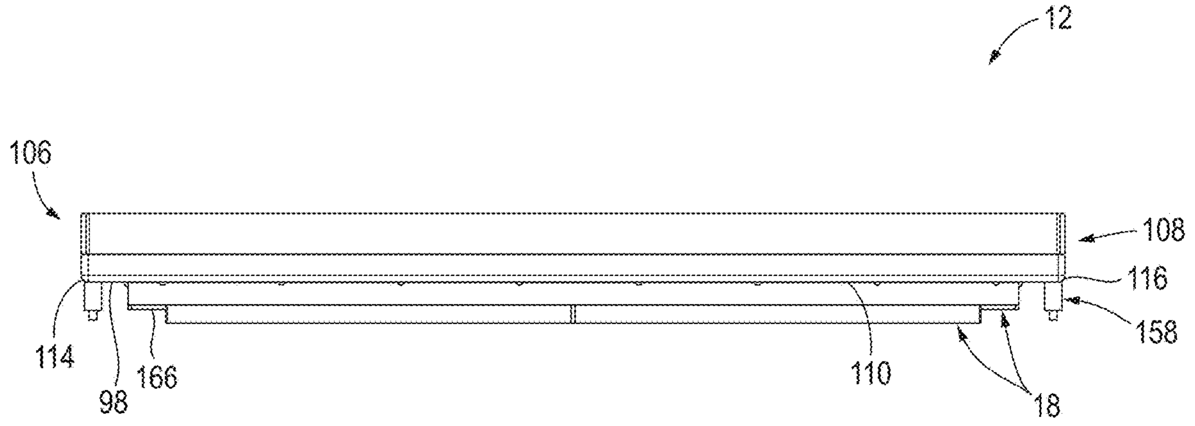
FIG. 10 is a front view of the griddle, according to another embodiment of the present invention.
Figure 11:
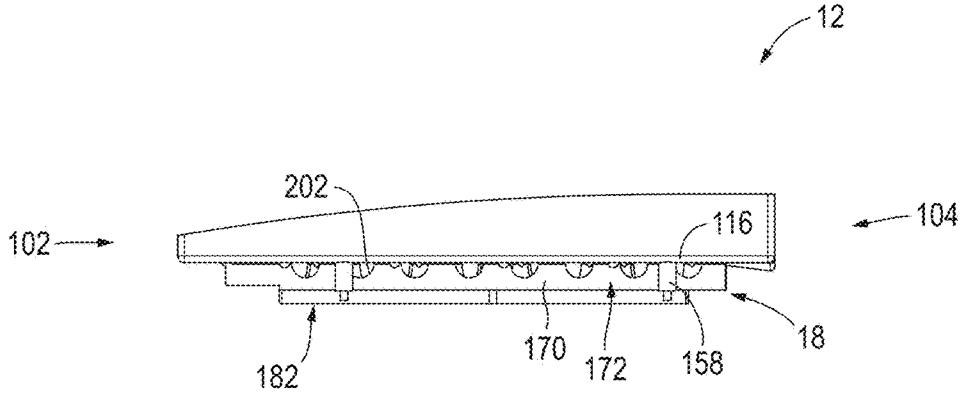
FIG. 11 is a right side view of the griddle, according to another embodiment of the present invention.
Figure 12:
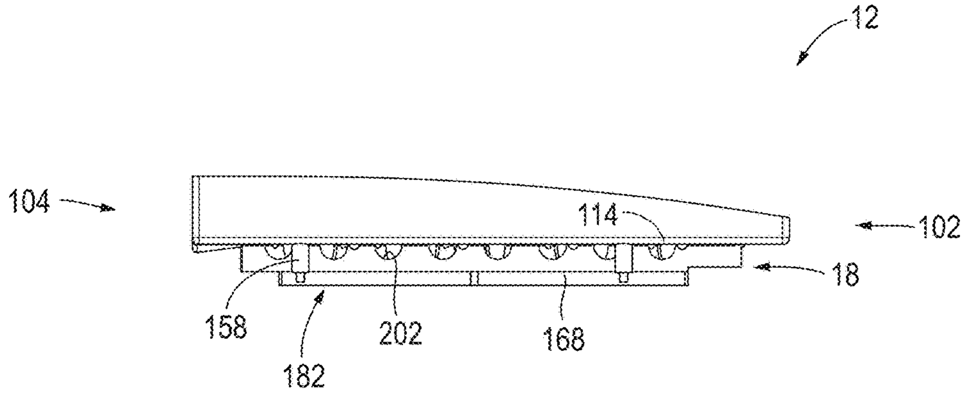
FIG. 12 is a left side view of the griddle, according to another embodiment of the present invention.
Figure 13:
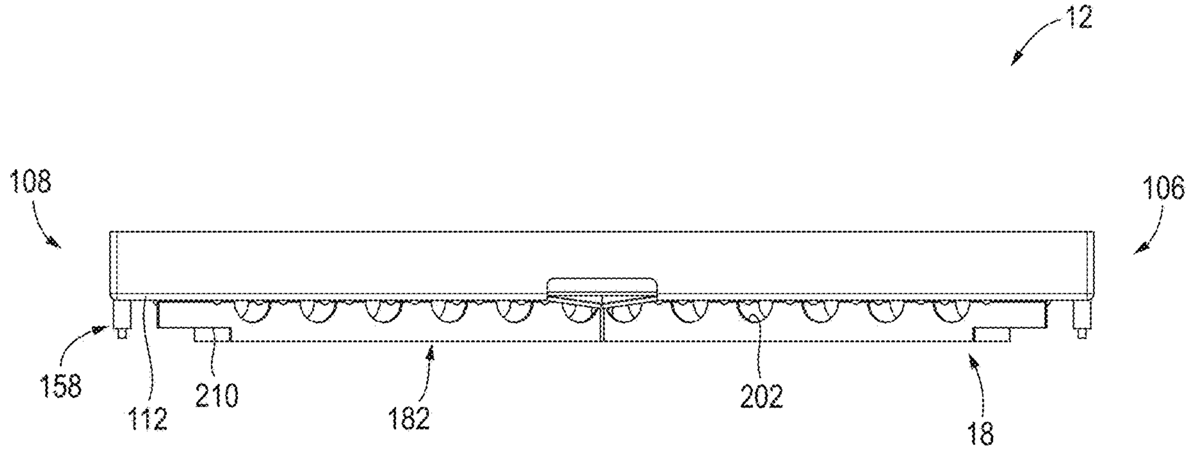
FIG. 13 is a rear view of the griddle, according to another embodiment of the present invention.

With respect to FIGS. 2, 7 and 10, the underside surface 98 may have four griddle legs 158 that may extend downward from the underside surface 98. Two of the griddle legs 158 may be located adjacently along the length of the left end periphery 114 and two of the griddle legs 158 may be located adjacently along the length of the right end periphery 116. Further, the top end 24 of the base 22 may have four holes 160, two of the holes 160 may be located along the length of the left ledge 42 and two of the holes 160 may be located along the length of the right ledge 44. The holes 160 may be sized and configured to allow the griddle legs 158 of the griddle 12 to be inserted therein so that the griddle 12 may be positioned and supported on an upper surface of the main body 13 of the cooking station 10 (see FIG. 1).

With respect to FIG. 6-9, as previously set forth, the underside surface 98 may include an understructure or reinforcement structure 18. The reinforcement structure 18 may be sized and configured to substantially maintain or hold the form of the griddle 12 as thermal stress and thermal strain is introduced to the griddle 12. In other words, the reinforcement structure 18 may assist in substantially preventing warping so that the cooking surface is substantially maintained in its planar form. Such reinforcement structure 18 may include multiple structural components directly secured to the underside surface 98 of the griddle 12. In one embodiment, the reinforcement structure 18 may extend adjacently along the front end periphery 110, the left end periphery 114, and the right end periphery 116, and/or between diagonally spaced corners of the underside surface 98. For example, the reinforcement structure 18 extending adjacently along the front end periphery 110 may be a front support structure 166. The front support structure 166 may extend parallel to the front end periphery 110. Further, the front support structure 166 may have a height that may extend downward a distance to minimize or substantially block heat from flowing out or escaping from the underside surface 98 along the front side 102 of the griddle 12. In this manner, the front support structure 166 may act to reinforce the griddle 12 undergoing thermal stress and strain as well as act as a shield to block heat from escaping toward the user along the front side 102 of the griddle.

The reinforcement structure 18 that may extend along the right and left end periphery 114, 116 may be defined as a left support structure 168 and a right support structure 170. The left support structure 168 and the right support structure 170 may also be the referenced as side support structures 172. The side support structures 172 may be similar in their description and may extend the length and parallel to the left end periphery 114 and right end periphery 116, respectively. The left support structure 168 may have a left support structure first end 174 and may extend to a left support structure second end 176. Similarly, the right support structure 170 may have a right support structure first end 178 and right support structure second end 180. Further, the left support structure first end 174 and right support structure first end 178 may be fixed and coupled to opposite ends of the front support structure 166 and may add to the rigidity and integrity of the griddle.

The reinforcement structure 18 may include diagonal support structures 182 that may extend diagonally across the underside surface 98. The diagonal support structures 182 may extend to define an x-configuration or x-structure. Such x-configuration may be formed as a single piece or continuous structure positioned directly against the underside surface 98. The continuous structure of the x-configuration may mean that different structural pieces may be interconnected together and to the underside surface 98 (via welding) to form the x-configuration or general x-structure. The diagonal support structures 182 may extend along the underside surface 98 so as to extend generally between oppositely spaced corners of the underside surface 98 of the griddle 12 such that terminal ends of the diagonal support structures 182 may extend between and adjacent to the front right corner 141 and the rear left corner 143 as well as the front left corner 139 and the rear right corners 145. The diagonal support structures 182 may have a height that may extend downward from the underside surface 98. Further, the diagonal support structures 182 may include a diagonal support structure first end 184 extending to a diagonal support structure second end 186. The diagonal support structures first end 184 may be fixed and coupled to opposite ends or end portions of the left support structure 168 and the diagonal support structures second end 186 may be fixed and coupled to opposite ends or end portions of the right support structure 170. The diagonal support structures 182 being fixed and coupled to the side support structures 172 may add to the rigidity and integrity of the griddle 12. In one embodiment, the diagonal support structures 182 coupled to the side support structures 172 may exhibit an hour-glass configuration 200. Further, the diagonal support structures 182 may define an intersection point 188 or central coupling between the diagonal support structures 182 that may be centrally located along the underside surface 98 of the griddle 12. Such central coupling 188 between the diagonal support structures 182 may be rigidly fixed to each other. Even further, the diagonal support structures 182 may extend to generally define various underside regions of the griddle 12, such as a front region 192, a rear region 194, a left region 196 and right region 198, discussed further herein.

The various components of the reinforcement structure 18 may be integrally formed with the underside surface 98 of the griddle 12. In one embodiment, the various components of the reinforcement structure 18, as set forth herein, may be integrally formed to the griddle by welding such components directly to the underside surface 98 of the griddle 12. In another embodiment, the various components of the reinforcement structure 18 may be integrally formed together via welding and integrally formed with the underside surface 98 of the griddle 12. In another embodiment, some of the adjacent components of the reinforcement structure 18 may be spaced from each other and integrally formed with the underside surface 98 of the griddle 12. Such reinforcement structure 18 may be positioned along the underside surface 98, as set forth herein, to substantially stabilize and maintain the plate member of the griddle 12 in a planar configuration or position so as to minimize the effects of thermal stress and thermal strain placed on the griddle 12. In this manner, the components of the reinforcement structure 18 may assist in resisting twisting or in other bending or warping of the griddle 12 due to the effects of the griddle 12 being placed under thermal stress and/or thermal strain.

With respect to FIGS. 6, 7, 11, 12 and 13, the side support structures 172 and/or diagonal support structures 182 may have vents 202 defined therein. The vents may extend within side support structures 172 and the diagonal support structures 182 so that the vents may be aligned along each corresponding length of the side support structure 172 and aligned along each corresponding length of the diagonal support structures 182. The vents may exhibit a half circle or partial circle shape, or any other suitable vent shape defined in portions of the reinforcement structure 18. The vents may be spaced relative to each other so that a flat portion 208 between adjacent spaced vents may be positioned against the underside surface 98 of the griddle 12. In another embodiment, the vents 202 may be formed in the side and diagonal support structures 172, 182 (so as to be completely surrounded by the structure of the side and diagonal support structures 172, 182) so that the flat portion may extend continuously along the respective lengths of the side and diagonal support structures 172, 182. The vents 202 may be open so as to define through holes in the side support structures 172 and the diagonal support structures 182. Such open through holes of the vents 202 facilitate air flow therethrough. For example, upon one or more of the flame burners 16 (FIG. 2) being ignited, the vents 202 allow the heated air from the flame burners to move from the front region 192 to the left and right regions 196, 198. Similarly, the heated air in the left and right regions 196, 198 may move toward the front region or move laterally toward the left and right sides of the griddle 12. Most of the heated air will be drawn away from the front support structure 166 due to the front support structure 166 being solid and not including vents therein, and due to the rear side 104 of the griddle being substantially open to allow heated air to escape. Such vents may be employed, as set forth herein, so that the heat from the flame burners does not build up or become trapped within any one of the front, left and right regions 192, 196, 198 of the griddle due to the understructure. In other words, the vents may be employed to control or direct the heat in particular directions, such as rearward and laterally, from the underside of the griddle.

In another embodiment, the vents 202 defined in the reinforcement structure 18 may allow the heat from the flame burners 16 to flow freely between the various regions along the underside surface of the griddle 12. For example, in one embodiment, the vents 202 associated with the reinforcement structure 18 may allow heat to transfer from one region to another region of the griddle 12 so that the heat eventually escapes out the rear side 104 and/or the left and right sides 106, 108 of the underside surface 98 of the griddle 12. In another embodiment, the vents 202 located along and in the side support structures 172 may allow heat to escape out the left side 106 and right side 108 of the underside surface 98 and may reduce the buildup of heat in one region of the griddle. In a further embodiment, the vents 202 may allow heat transfer from one of the regions to an adjacent region of the griddle 12, but not to the frontward region 192. In another embodiment, heat may flow from the front region 192 to either the left region 196 or the right region 198. In another embodiment, the left region 196 may allow flow of heat to the front region 192 and/or the rear region 194, and further, the vents 202 located on the left support structure 168 may also allow heat to escape the underside surface 98 of the griddle 12. In another embodiment, the vents 202 associated with the right region 198 may allow flow of heat to the front region 192 and/or the rear region 194, and further, the vents 202 located in the right support structure 170 may allow heat to escape the underside surface 98 of the griddle 12. In another embodiment, the vents 202 associated with the rear region 194 may allow flow of heat to the left region 196 and/or the right region 198, and further, heat may escape out the rear side 104 of the underside surface 98 of the griddle 12. In another embodiment, the vents 202 associated with the side and diagonal support structures 162, 172 may allow for heat to transfer across the underside surface 98 of the griddle 12 and may create a more evenly heated flat cooking surface 100 while the side and diagonal support structures 162, 172 and the front support structure 166 reduce the effects of the thermal stress and the thermal strain from heating and cooking on the griddle 12.

In another embodiment, the diagonal support structures 182 may include a notch 210 formed adjacent each of the ends of the x-configuration of the diagonal support structures 182. Such notch 210 may be positioned and sized so that the reinforcement structure 18 fits partially within the internal space 28 of the cooking station 10 and so that portions of the reinforcement structure 18, adjacent the ends of x-configuration, do not interfere with the upper side of the main body or base 22 of the cooking station 10 (see FIG. 2). In another embodiment, a height 212 of the diagonal support structures 182 may be greater than a height 214 of the side support structures 172 and a height of the front support structure 166. Such additional height 212 of the diagonal support structures 182 may provide additional rigidity to the griddle 12 and resistance to twisting of the griddle 12 due to the effects of thermal stresses and strains to the griddle 12. In another embodiment, the height 212 of the diagonal support structures 182 may vary in a stepped manner along a length of the various components of the diagonal support structures 182. In still another embodiment, the height 212 of the diagonal support structures 182 may vary in a tapered manner such that the height may be greatest at or adjacent the intersection point 188 or juncture of the diagonal support structures 182 and such that the height may slope down toward the ends of the x-configuration of the diagonal support structures 182. In another embodiment, the height 212 of the diagonal support structures may vary with a taper as well as vary in a stepped manner along the lengths of the various diagonal support structures 182 such that the height may be greatest along and adjacent the intersection point 188 of the x-configuration of the diagonal support structures 182. In another embodiment, the diagonal support structures 182 may include a lateral extension, such as the lateral extension 414 depicted in the embodiment of FIG. 20. Such lateral extension may enhance the structural integrity of the diagonal support structures 182 and, thus, may enhance the structural integrity of the griddle 222.

Now with reference to FIGS. 14-18, another embodiment of a reinforcement structure 220 secured to a griddle 222 sized and configured to be positioned on a cooking station 224 is provided. In this embodiment, the reinforcement structure 220 may be substantially similar to the reinforcement structure depicted and described in the previous embodiment, except the reinforcement structure 220 of this embodiment does not include vents in all of the same components of the previously described embodiment of the reinforcement structure.

Figure 14:
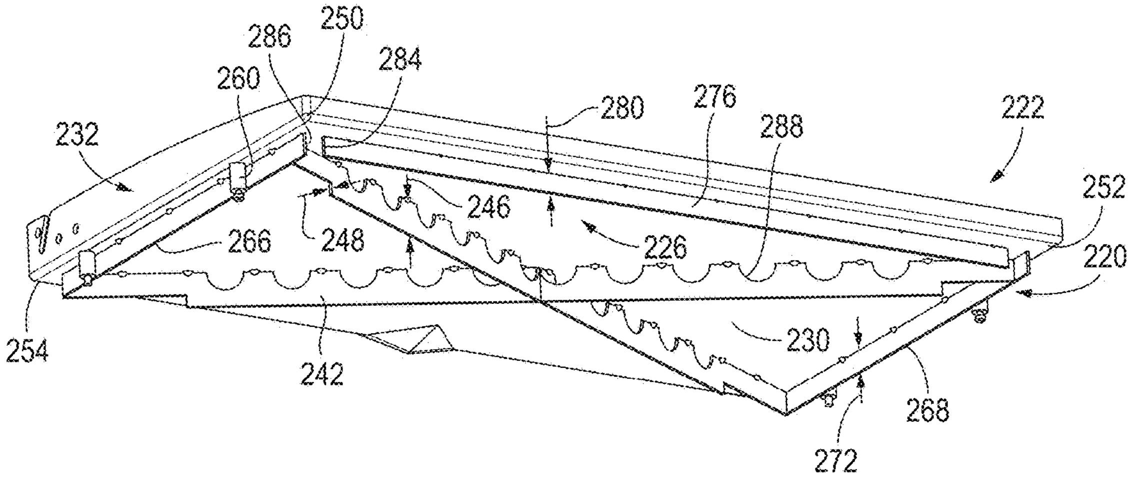
FIG. 14 is a perspective view of another embodiment of a griddle with a reinforcement structure, according to the present invention.
Figure 15:
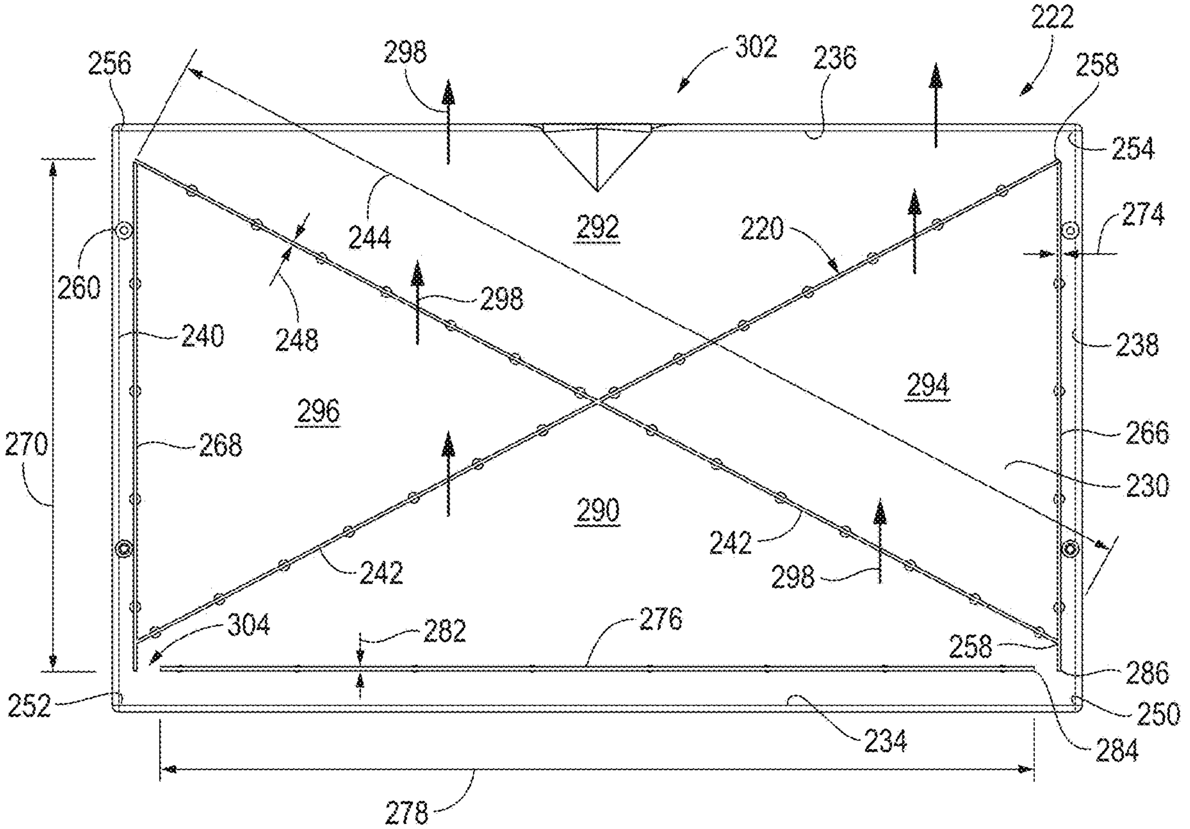
FIG. 15 is a bottom view of the griddle of FIG. 14, according to another embodiment of the present invention.

With respect to FIGS. 14 and 15, the griddle 222 may extend with a plate member with opposing side surfaces, namely, a flat cooking surface 228 (FIG. 16) and an underside surface 230. Such griddle plate 226 may be rectangular in shape or rectangular configuration, meaning the flat cooking surface 228 and the underside surface 230 may also be rectangular. The rectangular shape may also have the meaning of being square in shape. As in the previous embodiment, the griddle 222 may include a splash guard 232 or wall extending upward from the periphery of the flat cooking surface 228. Further, the underside surface 230 may extend to define a front end 234, a rear end 236, a first end 238, and a second end 240. The front end 234 may extend parallel relative to the rear end 236. The first end 238 may extend parallel relative to the second end 240.

The reinforcement structure 220 may extend along and be secured directly to the underside surface 230 of the griddle 222. In one embodiment, the reinforcement structure 220 may extend to define diagonal reinforcement portions 242 each extending with an elongate structure, defining a length 244, a height 246, and a thickness 248. The diagonal reinforcement portions 242 may extend crosswise relative to each other so as to exhibit an x-configuration. In another embodiment, each of the diagonal reinforcement portions 242 may extend transverse along the underside surface 230 relative to each of the front end 234, the rear end 236, the first end 238 and the second end 240 of the underside surface 230 of the griddle 222. In another embodiment, the reinforcement structure 220 may include reinforcement portions that extend longitudinally along the underside surface 230 such that the reinforcement portions may be fixedly positioned to extend longitudinally transverse relative to each of the front end 234, the rear end 236, the first end 238 and the second end 240 of the underside surface 230 of the griddle 222. In another embodiment, the diagonal reinforcement portions 242 may extend to exhibit an x-configuration. In another embodiment, the diagonal reinforcement portions 242 may extend longitudinally transverse relative to any one of the front end 234, the rear end 236, the first end 238 and the second end 240 to generally exhibit a diamond configuration. Such a diamond configuration may include different pieces interconnected together, via welding, as well as being secured to the underside surface 230 of the griddle, via welding.

The underside surface 230 of the griddle 222 may extend to define first and second front corners 250, 252 and first and second rear corners 254, 256 of the griddle 222, each of the corners being corners of the rectangular configuration. The griddle 222 with the x-configuration of the diagonal reinforcement portions 242 may extend with terminal ends or ends 258 such that the ends 258 may be positioned adjacent corresponding ones of the first and second front corners 250, 252 and the first and second rear corners 254, 256 of the griddle 222. Even though the ends 258 of the x-configuration that are closest to respective ones of the first and second front corners 250, 252 may include other portions of the reinforcement structure 220 that are closer to the first and second front corners 250, 252, such ends 258 may still be considered adjacent to the first and second front corners 250, 252 due to their relative close proximity to the first and second front corners 250, 252 compared to, for example, an intersection point 264 of the diagonal reinforcement portions 242 of the x-configuration. In addition, the underside surface 230 of the griddle 222 may include griddle legs 260, similar to the previous embodiment. Such griddle legs 260 may be sized and configured to correspond with openings (not shown) defined in an upper side 262 of the cooking station 224 (see FIG. 16).

In another embodiment, the reinforcement structure 220 may include a first side reinforcement portion 266 and a second side reinforcement portion 268. Each of the first and second side reinforcement portions 266, 268 extend with a longitudinal side length 270, a side height 272 (see also FIG. 18), and a side depth 274. Further, each of the first and second side reinforcement portions 266, 268 may longitudinally extend with its side length adjacently along the first end 238 and the second end 240, respectively, of the underside surface 230 of the griddle 222, and positioned directly against the underside surface 230 of the griddle. In another embodiment, at least one of the ends 258 of the x-configuration of the diagonal reinforcement portions 242 directly connects with one of the first and second side reinforcement portions 266, 268.

Furthermore, in another embodiment, the reinforcement structure 220 includes a front side reinforcement portion 276. Such front side reinforcement portion 276 may be an elongated structure, similar to the other reinforcement components of the reinforcement structure 220, extending to define a front length 278, a front height 280, and a thickness 282. The front side reinforcement portion 276 may be positioned on the underside surface 230 of the griddle 222 to longitudinally extend along the front end 234 and between the first end 238 and the second end 240 of the underside surface 230 of the griddle 222. In one embodiment, opposing ends 284 of the front side reinforcement portion 276 may be spaced from front side ends 286 of the first and second side reinforcement portions 266, 268. In another embodiment, opposing ends 284 of the front side reinforcement portion 276 may be directly coupled to the first and second side reinforcement portions 266, 268, similar to that of the previous embodiment.

Similar to the previous embodiment, the reinforcement structure 220 may include vents or notches 288 defined in the reinforcement structure 220. For example, in this embodiment, the diagonal reinforcement portions 242 extend with lengths 244 defining the x-configuration. Each of the lengths 244 of the diagonal reinforcement portions 242 define the notches 288 along each of the lengths, the notches 288 being designed so as to be sized and configured to facilitate heat flow through the notches 288 so that as the griddle 222 is heated by the cooking station 224 (FIG. 16), the heat may flow past or through the diagonal reinforcement portions 242 to different regions of the underside surface 230 of the griddle 222. In this manner, the notches 288 defined in the diagonal reinforcement portions 242 facilitate the griddle 222 to be heated in a uniform manner. In one embodiment, the notches 288 may extend to define half circle or partial circle notches aligned and spaced along the lengths 244 defining the diagonal reinforcement portions 242. Further, similar to the previous embodiment, the diagonal reinforcement portions 242 extending along the underside surface 230 of the griddle 222 may define a front region 290, a rear region 292, a first region 294 and a second region 296. Further, as previously set forth, this embodiment may not include notches or vents formed in the first and second side reinforcement portions 266, 268. As such, in this embodiment, since the notches 288 or vents are only defined in the diagonal reinforcement portions 242 and not in the front reinforcement portion 276 and the first and second side reinforcement portions 266, 268, the front height 280 of the front reinforcement portion 276 as well as the side height 272 of each of the first and second side reinforcement portions 266, 268 may be sized and configured to substantially block heat from escaping the underside surface 230 of the griddle 222 laterally over such front reinforcement portion 276, and laterally over the first and second side reinforcement portions 266, 268. Further, the front reinforcement portion 276 and the first and second side reinforcement portions 266, 268 may be sized and configured to direct the flow of heat primarily in a rearward direction, as depicted by arrows 298. As such, the heat may flow and move past the diagonal reinforcement portions 242 so as to move through the notches 288 and vents defined in the diagonal reinforcement portions so that the heat may flow and escape the underside surface 230 of the griddle 222 substantially along a rear side 302 of the griddle 222.

Figure 16:
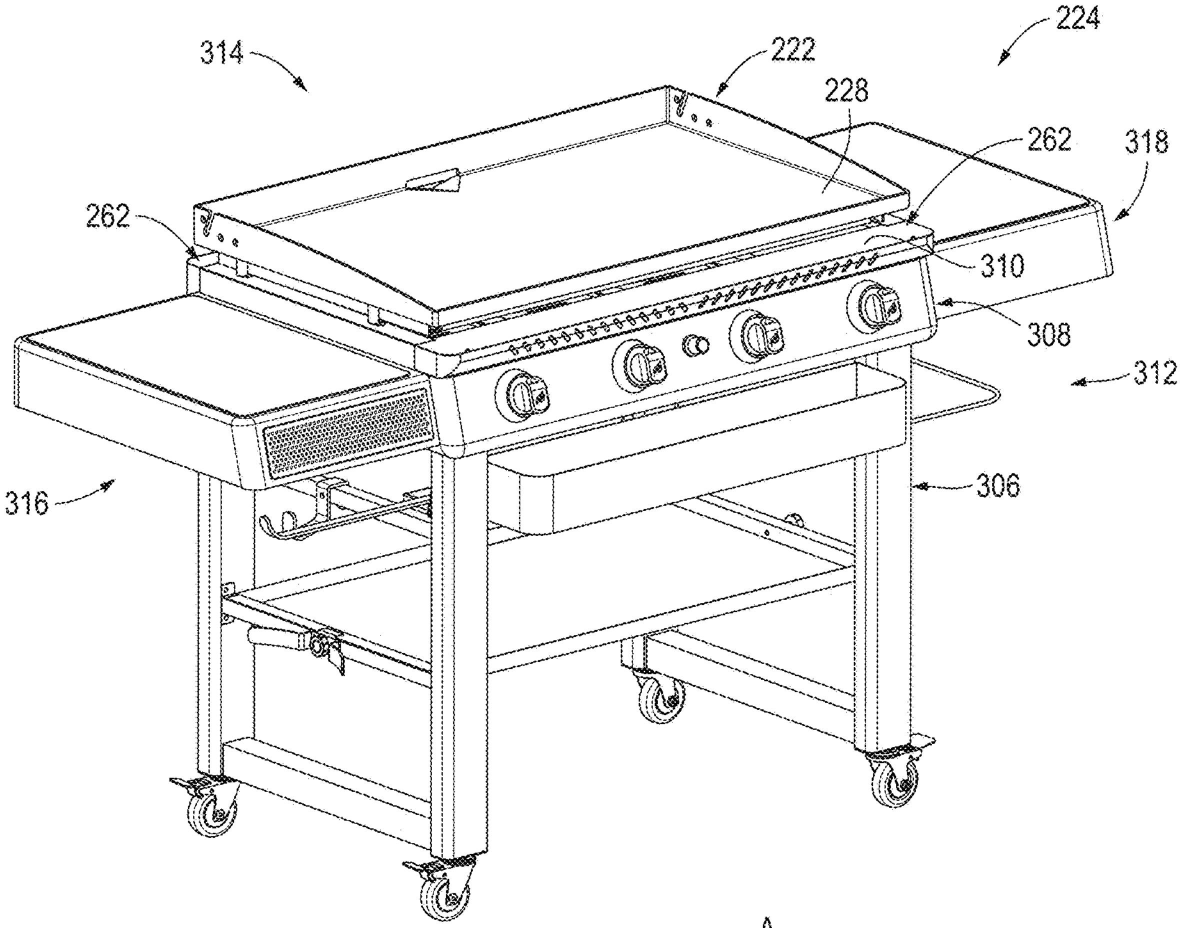
FIG. 16 is a perspective view of a cooking station with the griddle of FIG. 14 positioned thereon, according to another embodiment of the present invention.

For example, in this embodiment, the reinforcement structure 220, with its various components, may be sized and configured to facilitate heat to flow rearward along the underside surface 230 of the griddle 222 so as to exit from the rear side 302 of the griddle 222 and cooking station 224 (FIG. 16). Further, due to the disconnected ends of the front reinforcement portion 276, a small amount of heat may escape through end openings 304 defined between the ends 284 of the front reinforcement portion 276 and the front side ends 286 of the first and second side reinforcement portions 266, 268. Such small amount of heat may assist in warming portions adjacent to the front end 234 of the griddle 222. Further, the front height 278 of the front reinforcement portion 276 may be smaller than the side height 272 of the first and second side reinforcement portions 266, 268 so that some heat may move under the front reinforcement portion 276 to assist in heating portions of the griddle 222 adjacent the front end 234 of the griddle 222. However, for the most part, as the griddle 222 is heated by the cooking station 224, due to the rear side 302 of the griddle 222 being substantially unobstructed, or rather, having the largest escape opening relative to the upper side of the cooking station 224 (FIG. 16), the heat flow will be drawn rearward, as shown by arrows 298, toward the largest opening defined between the griddle 222 and the upper side 262 (FIG. 16) of the cooking station 224. That is, due to the notches 288 and vents defined in the diagonal reinforcement portions 242, heat in the front region 290 of the underside surface 230 of the griddle 222 will be drawn to flow from the front region 290 and into the first and second regions 294, 296 of the griddle 222. Further, heat in the first and second regions 294, 296 of the griddle 222 will be drawn to flow therefrom and into the rear region 292 of the griddle 222, and heat in the rear region 292 will continue to be drawn to flow from the rear region 292 and out the rear side 302 of the griddle 222 as well as rearward of the associated cooking station.

Now with reference to 16, 17, 17A and 18, the griddle 222 of this embodiment will now be described with the cooking station 224, also with reference to FIGS. 14 and 15. As in the previous embodiment, the cooking station 224 includes a main body 306 with a base 308 that extends to define an upper end 310 of the base 308. Such upper end 310 may be rectangular and sized and configured to support the griddle 222, similar to that described and depicted relative to FIGS. 1 and 2 herein. Further, the cooking station 224 and griddle 222 positioned thereon extends to define a front side 312, a rear side 314, a first side 316 and a second side 318. The front side 312 may be opposite to the rear side 314, and the first side 316 may be opposite of the second side 318.

Similar to the previous embodiment, the main body 306 includes a heating element 320, that may be in the form of gas flame burners 322, that may be supported by the base 308 and positioned below the upper end 310 of the base 308. As such, upon the griddle 222 being positioned over the upper end 310 of the base 308, the griddle 222 sits above and over the heating element 320. Further, upon the griddle 222 being positioned over the upper end 310 of the base 308, the underside surface 230 of the griddle 222 sits above the upper end 310 of the base 308 so as to define a gap 324. This gap 324 may be defined between each peripheral side or end of the underside surface 230 of the griddle 222, namely, between the respective front end 234, the rear end 236, the first end 238 and the second end 240 and the upper end 310 of the main body 306 (see, FIG. 15). In this embodiment, the gap 324 may be substantially blocked by the reinforcement structure 220 adjacently along each of the front end 234, the first end 238 and the second end 240, but left open adjacently along the rear end 236, as previously described. In addition to blocking the heat flow along the underside surface 230 of the griddle 222, as previously described, these components (i.e., the front reinforcement portion 276, the first and second side reinforcement portions 266, 268) of the reinforcement structure 220 also substantially blocks external air flow, e.g., blowing wind, as depicted by arrow 326, from passing through the gap 324 along each of the front side 312 and the first and second sides 316, 318 of the cooking station 224.

Figure 18:
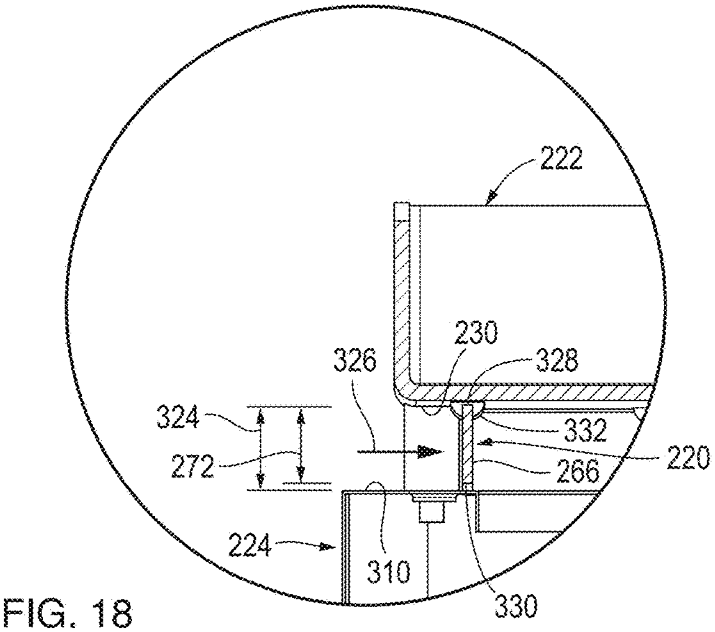
FIG. 18 is an enlarged view of the griddle taken from region B of FIG. 17A, according to another embodiment of the present invention.

As depicted in FIG. 18, the first side reinforcement portion 266 may extend from and be secured to the underside surface 230 of the griddle 222. The first side reinforcement portion 266 may define the side height 272 extending between a first end 328 and a second end 330 of the first side reinforcement portion 266. The first end 328 of the height of the first side reinforcement portion 266 may extend along the side length 270 (FIG. 15) thereof and may be secured to the underside surface 230 of the griddle 222 with welds 332, as depicted. The second end 330 of the side height 272 of the first side reinforcement portion 266 may be a free end and be positioned adjacent the upper end 310 such that the side height 272 extends to block the gap 324, as previously set forth. The second side reinforcement portion 268 and the front reinforcement portion 376 may include similar structure and provide similar function to that described relative to the first side reinforcement portion 266. In this manner, not only does the reinforcement structure 220 and its various components provide the advantages of substantially minimizing potential warping of the griddle due to thermal stress and strain placed on the griddle 222 (as discussed in detail herein), the reinforcement structure 222 directs the heat flow to be drawn rearward below the griddle 222 as well as blocks external air flow 326, such as wind, from entering the gap 324 of three of the four sides between the griddle 222 and the cooking station 224.

Figure 19:
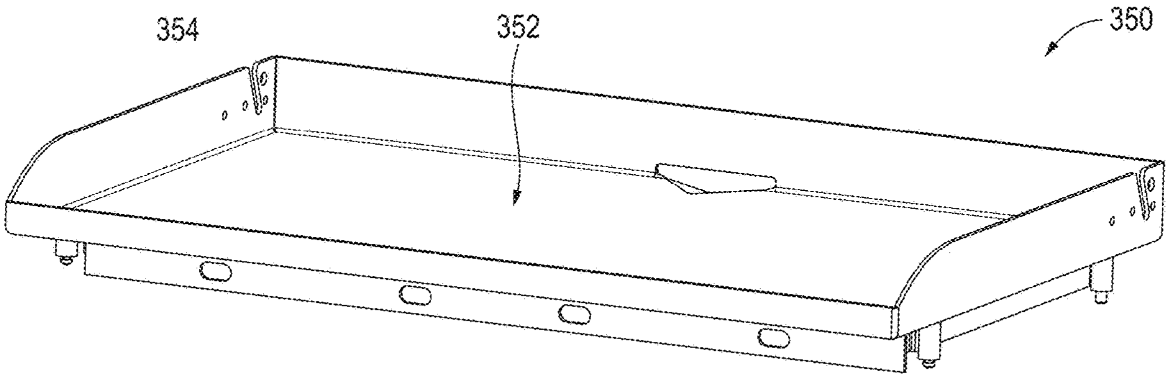
FIG. 19 is a top perspective view of another embodiment of a griddle, according to the present invention.
Figure 20:
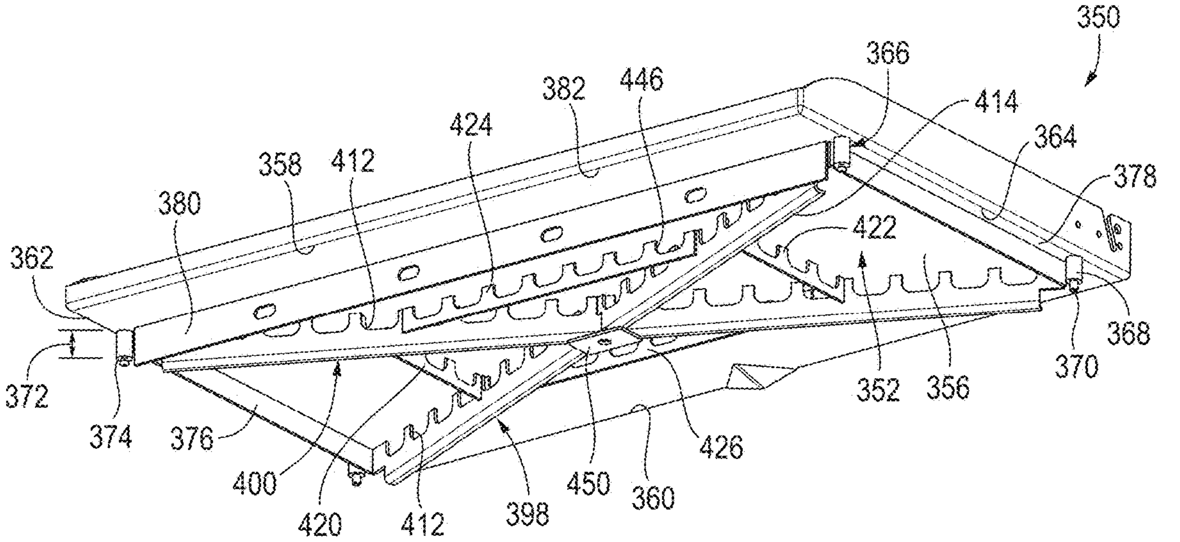
FIG. 20 is a bottom perspective view of the griddle of FIG. 19, depicting another embodiment of a reinforcement structure secured to and along an underside surface of the griddle, according to the present invention.

With reference to FIGS. 19 and 20, another embodiment of a griddle 350 is provided. In this embodiment, the griddle 350 includes a flat plate 352 extending with a flat cooking surface 354 and an oppositely facing underside surface 356, the underside surface 356 including multiple understructure components that may be interconnected to each other. Such understructure components may be positioned along the underside surface 356 in a manner to minimize the effects of thermal stress and strain so as to substantially prevent warping of the flat plate 352 of the griddle 350. The flat cooking surface 354 and the underside surface of the flat plate may extend with a rectangular shape. The underside surface may extend to define a front end, a rear end, a first end and a second end. The front end may extend parallel relative to and with the rear end and the first end may extend parallel relative to and with the second end (see also, FIG. 21).

Figure 17:
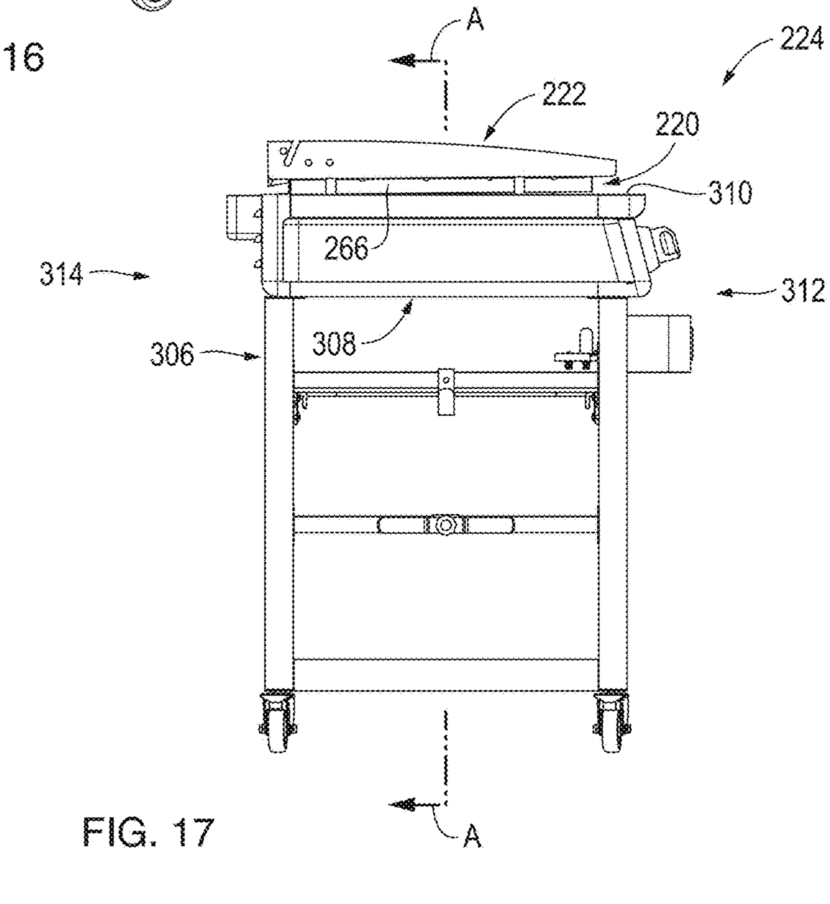
FIG. 17 is a side view of the cooking station and griddle of FIG. 16, depicting a gap between the griddle and an upper end of the cooking station, according to another embodiment of the present invention.
Figure 17A:
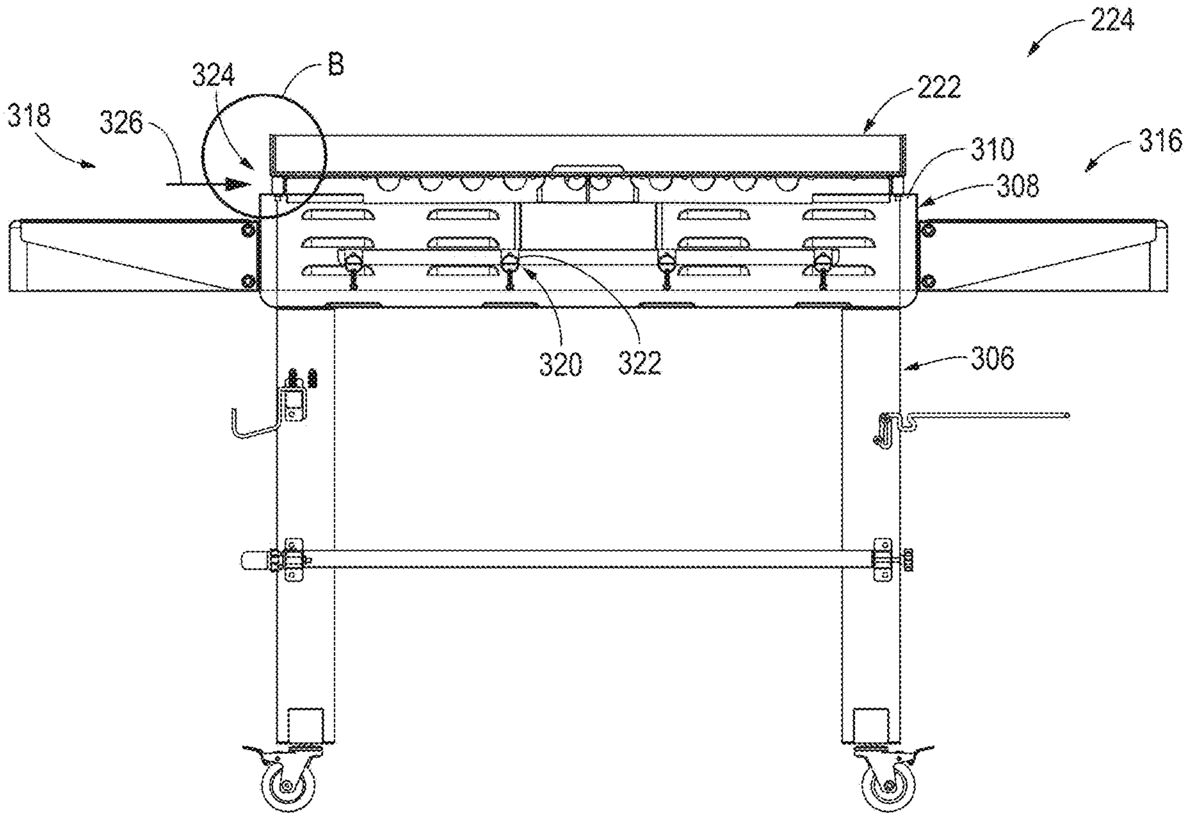
FIG. 17A is a cross-sectional view of the cooking station and griddle taken along section line A-A of FIG. 17, according to another embodiment of the present invention.

Referring to FIGS. 20-23, similar to previous embodiments, the griddle 350 may include griddle legs 366 positioned adjacent the first and second ends 362, 364 and extending from the underside surface 356 of the griddle 350. The griddle legs 366 may be sized and configured to be positioned within structure of a main body of a cooking station so that the griddle may be supported by the main body, similar to that depicted in FIGS. 17A and 18. The griddle legs 366 may each include a base portion 368 and an end portion 370, the base portion 368 defining a base leg height 372 defined between the underside surface 356 of the griddle 350 and a resting surface 374 of the griddle legs. The transition between the base portion 368 and the end portion 370 may define the resting surface 374 so as to define a step structure, the resting surface 374 of the griddle legs 366 sized and configured to support the griddle 350 such that the resting surface 374 may be positioned against an upper side or upper end 310 of the main body 324 of the cooking station 224 so as to define a gap 324, the base leg height 372 corresponding with the gap 324 (see FIG. 18).

Figure 21:
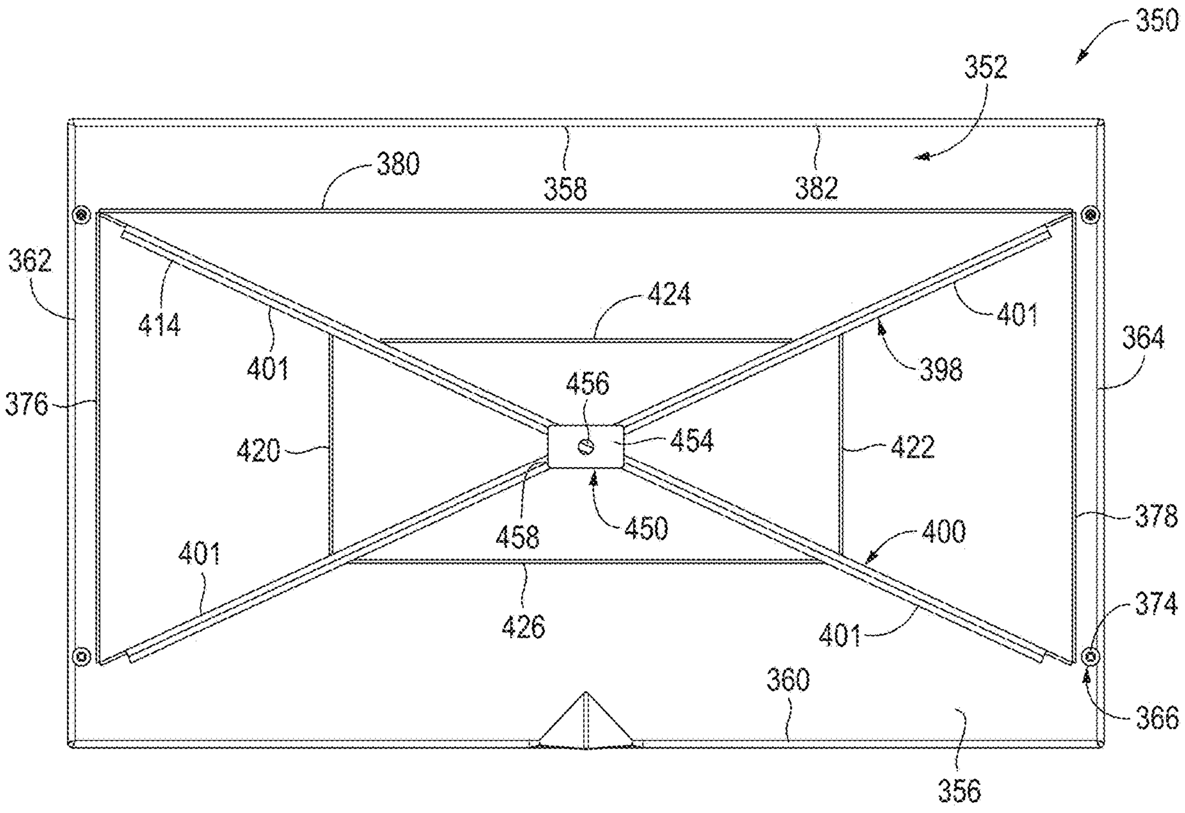
FIG. 21 is a bottom view of the griddle of FIG. 20, according to another embodiment of the present invention.
Figure 24:
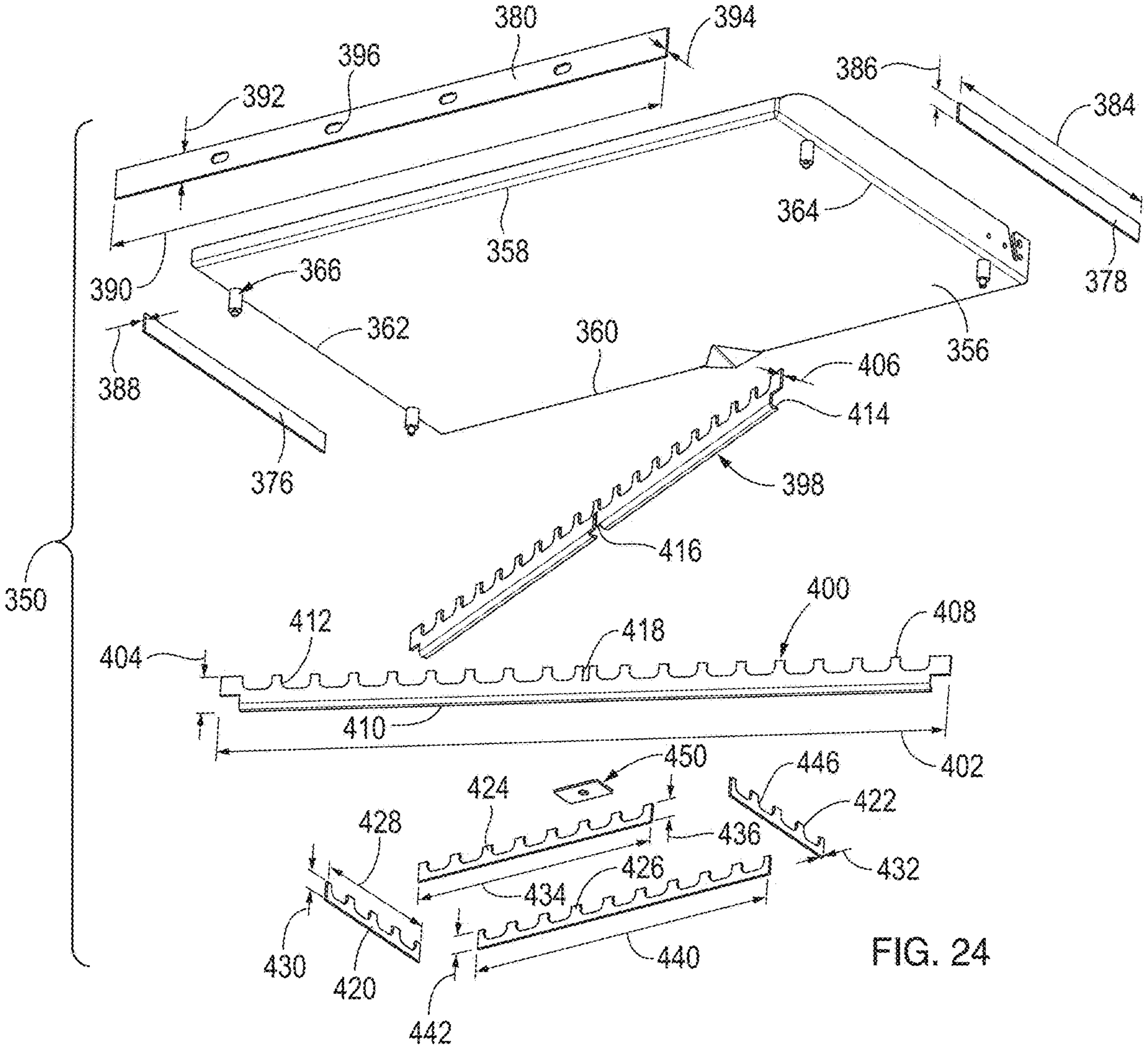
FIG. 24 is an exploded view of some of the components of the griddle of FIG. 20, according to another embodiment of the present invention.

Now with reference to FIGS. 20, 21 and 24, the griddle 350 may include a first side rib 376, a second side rib 378, and a front rib 380 each of which may be fixedly positioned against the underside surface 356 and adjacently along portions of a periphery 382 of the griddle plate or flat plate 352 of the griddle 350. For example, the first side rib 376 may be positioned adjacently along the first end 362 of the underside surface 356 so that the first side rib 376 may extend parallel with the first end 362. Similarly, the second side rib 378 may be positioned adjacently along the second end 364 of the underside surface 356 so that the second side rib 378 may extend parallel with the second end 364 of the griddle 350. Further, the front rib 380 may be positioned along the front end 358 of the underside surface 356 so that the front rib 380 may extend perpendicular relative to the first side rib 376 and the second side rib 378. As such, the first side rib 376 may extend parallel relative to the second side rib 378.

Further, in another embodiment, opposing ends of the front rib 380 may be directly coupled to one end of the first side rib 376 and one end of the second side rib 378. In another embodiment, opposing ends of the first side rib 376 may be positioned adjacent two of the griddle legs 366 adjacent the first end 362 of the griddle 350. Similarly, opposing ends of the second side rib 378 may be positioned adjacent two other ones of the griddle legs 366 adjacent the second end 364 of the griddle 350. The first side rib 376 and the second side rib 378 may be similarly sized such that each may extend with a longitudinal length 384, a height 386 and a thickness 388, the length 384 being greater than the height 386 and thickness 388 and the height 386 being greater than the thickness 388 of the first and second side ribs 376, 378. In another embodiment, the height 386 of the first and second side ribs 376, 378 may be slightly smaller or the same size as the base leg height 372 of the base portion 368 of the griddle legs 366. In this manner, the first and second side ribs 376, 378 may act to block the gap 324 (FIG. 18) defined between an upper side of a cooking station 224 (FIG. 18) and the underside surface 356 of the griddle 350, similar to that depicted and described relative to FIGS. 17A and 18. As such, the height 386 of the first and second side ribs 376, 378 may be sized and configured to block air from flowing through the gap 324 (FIG. 18).

Figure 22:
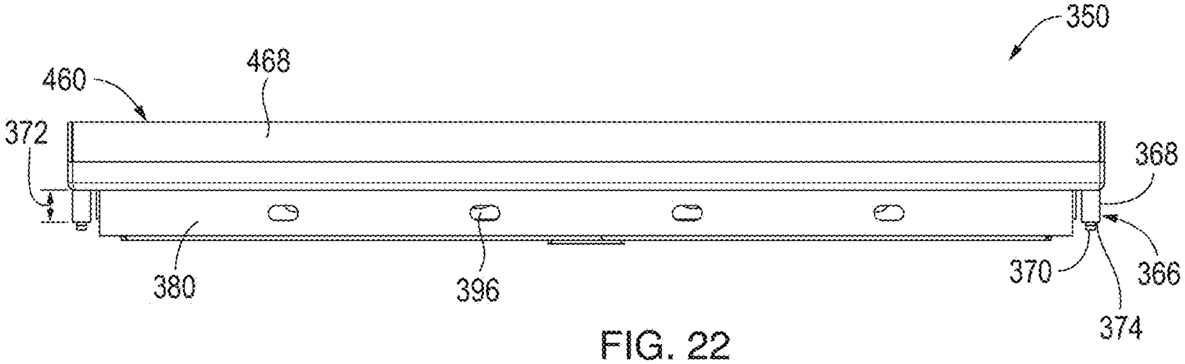
FIG. 22 is a front view of the griddle of FIG. 20, according to another embodiment of the present invention.
Figure 23:
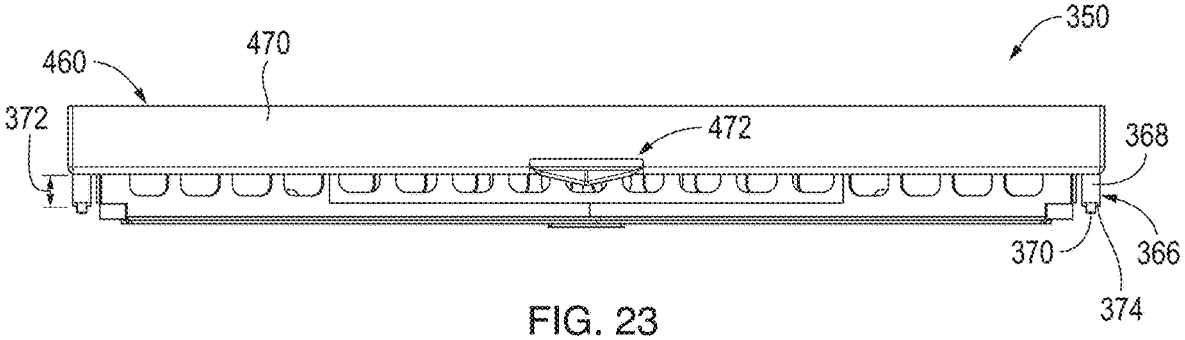
FIG. 23 is a rear view of the griddle of FIG. 20, according to another embodiment of the present invention.

With respect to FIGS. 20, 22 and 24, in another embodiment, the front rib 380 may extend with a longitudinal length 390, a front rib height 392 and a thickness 394, the length 390 being longer than the height 392 and thickness 394, and the height 392 being larger than the thickness 394. The front rib height 392 may be larger than the height 386 of the first and second side ribs 376, 378. Further, in another embodiment, the front rib 380 may include multiple holes 396 extending through the thickness 394 of the front rib 380. Such holes 396 may be evenly spaced relative to each other along the length 390 of the front rib 380 so as to completely extend through the front rib 380. Furthermore, the holes 396 may be positioned within the front rib 380 to facilitate viewing, for example, a gas flame of a heating element 14 of a cooking station 10, upon the griddle 350 being positioned on the cooking station 10 (see FIG. 2). In this manner, the front rib 380 may act to at least partially block the gap between the underside surface 356 of the griddle 350 and an upper side of the cooking station, similar to that described and depicted in FIGS. 17A and 18, as well as allow a person to view whether there is an appropriate gas flame by peering through the holes 396 defined in the front rib 380.

With reference again to FIGS. 20, 21 and 24, the griddle 350 may include reinforcement structure sized and configured to minimize the effects of thermal stress of the flat plate 352 of the griddle 350. For example, the griddle 350 may include a first diagonal reinforcement portion 398 and a second diagonal reinforcement portion 400. The first and second diagonal reinforcement portions 398, 400 may each be positioned along the underside surface 356 of the griddle 350 so that a longitudinal length 402 of the first and second diagonal reinforcement portions 398, 400 may extend longitudinally transverse along the underside surface 356 relative to each of, or any one of, the front end 358, the rear end 360, the first end 362 and the second end 364 of the underside surface 356 of the griddle 350. In one embodiment, the first and second diagonal reinforcement portions 398, 400 may be positioned to extend along the underside surface 356 of the griddle 350 to exhibit an x-configuration. In another embodiment, the x-configuration may extend to define multiple diagonal portions 401 that may be positioned to extend transverse relative to the front end 358, the rear end 360, the first end 362 and the second end 364 of the underside surface 356 of the griddle 350.

Further, each of the first and second diagonal reinforcement portions 398, 400 may each extend to define the longitudinal length 402, a height 404, and a thickness 406, the length 402 being greater than the height 404 and the thickness 406. The height 404 of each of the first and second diagonal reinforcement portions 398, 400 may extend between first and second sides 408, 410. The first side 408 of each of the first and second diagonal reinforcement portions 398, 400 may be directly coupled to the underside surface 356 of the griddle 350. Further, the first side 408 of both the first and second diagonal reinforcement portions 398, 400 may define multiple notches 412 or openings therein, similar to that described in previous griddle embodiments herein. Such notches 412 may generally be evenly spaced along the length 402 of each of the first and second diagonal reinforcement portions 398, 400 and may be sized and configured to facilitate heat to flow through the notches 412. The second side 410 of the first and second diagonal reinforcement portions 398, 400 may be a free end. In another embodiment, the second side 410 of the first and second diagonal reinforcement portions 398, 400 may include a lateral extension 414 (see also FIGS. 27 and 28), the lateral extension 414 extending generally perpendicular relative to the height 404 dimension and the length 402 dimension of the first and second diagonal reinforcement portions 398, 400. Such lateral extension 414 may further facilitate resisting bending or torsion placed upon the first and second diagonal reinforcement portions 398, 400 as a result of the first side 408 being fixed to the underside surface 356 of the flat plate 352 of the griddle 350 and as a result of thermal stress and strain being placed upon the griddle 350.

Furthermore, the first and second diagonal reinforcement portions 398, 400 may each include a coupling notch, such as a first coupling notch 416 and a second coupling notch 418, respectively. The first and second coupling notches 416, 418 may be defined at a mid-point or central portion of the longitudinal length 402 of the first and second diagonal reinforcement portions 398, 400. Further, the first coupling notch 416 may be defined in the second side 410 of the first diagonal reinforcement portion 398 and the second coupling notch 418 may be defined in the first side 408 of the second diagonal reinforcement portion 400. Also, the first coupling notch 416 may be sized and configured to interlock with the second coupling notch 418 so that the first and second diagonal reinforcement portions 398, 400 may be coupled together in a manner to exhibit the x-configuration. In another embodiment, the first and second diagonal reinforcement portions 398, 400 may be directly coupled to the underside surface 356 such that ends of the first and second diagonal reinforcement portions 398, 400 may be coupled to opposing ends of the corresponding one of the first and second side ribs 376, 378.

In another embodiment, the reinforcement structure of the griddle 350 may include first and second side reinforcement portions 420, 422, a front reinforcement portion 424 and a rear reinforcement portion 426. The first side reinforcement portion 420 may be positioned between adjacently extending diagonal portions 401 of the first and second diagonal reinforcement portions 398, 400 such that the first side reinforcement portion 420 may be spaced from and extend parallel with the first end 362 of the underside surface 356 of the griddle 350. Similarly, the second side reinforcement portion 422 may be positioned between the diagonal portions 401 of the first and second diagonal reinforcement portions 398, 400 such that the second side reinforcement portion 422 may be spaced from and extend parallel with the second end 364 of the underside surface 356 of the griddle 350. In another embodiment, the first side reinforcement portion 420 may be spaced from and extend parallel with the first side rib 376 and the second side reinforcement portion 422 may be spaced from and extend parallel with the second side rib 378. In still another embodiment, the first side reinforcement portion 420 and the second side reinforcement portion 422 may each define a similar longitudinal length 428, height 430 and thickness 432, the longitudinal length 428 being greater than the height 430 and thickness 432. In another embodiment, the height 430 of the first and second side reinforcement portions 420, 422 may be smaller than the height 404 of the majority of the length 402 of the first and second diagonal reinforcement portions 398, 400. In another embodiment, the height 430 of the first and second side reinforcement portions 420, 422 may be similar to the height 386 of the first and second side ribs 376, 378. In another embodiment, the height 430 of the first and second side reinforcement portions 420, 422 may be similar to the height 404 of the first and second diagonal reinforcement portions 398, 400.

The front reinforcement portion 424 may be spaced from and extend parallel to the front end 358 such that the front reinforcement portion 424 may be positioned between the first and second diagonal reinforcement portions 398, 400. In another embodiment, the front reinforcement portion 424 may be positioned along the underside surface 356 to be spaced from and parallel with the front rib 380 so as to be positioned between the first and second diagonal reinforcement portions 398, 400. In another embodiment, opposing ends of the front reinforcement portion 424 may be directly contacting so as to be fixedly coupled to the first and second diagonal reinforcement portions 398, 400. Further, the front reinforcement portion 424 may extend with a longitudinal length 434, a height 436 and a thickness, the longitudinal length 434 being greater than the height 436. Such height 436 of the front reinforcement portion 424 may be similar to the height 430 of the first and second side reinforcement portions 420, 422. In another embodiment, the height 436 of the front reinforcement portion 424 may be smaller than the height 404 of the first and second diagonal reinforcement portions 398, 400.

Similar to the front reinforcement portion 424, the rear reinforcement portion 426 may be spaced from and extend parallel to the rear end 360 of the underside surface 356 such that the rear reinforcement portion 426 may be positioned between the first and second diagonal reinforcement portions 398, 400. In another embodiment, the rear reinforcement portion 426 may be positioned along the underside surface 356 so as to be spaced from and extend perpendicular relative to the first and second ends 362, 364 and, further, perpendicular relative to the first and second side ribs 376, 378. The rear reinforcement portion 426 may extend with a longitudinal length 440, a height 442 and a thickness, the longitudinal length 440 being greater than the height 442 and the thickness. In one embodiment, the length 440 of the rear reinforcement portion 426 may be greater than the length 434 of the front reinforcement portion 424. In another embodiment, the length 440 of the rear reinforcement portion 426 may be similar to or equal to the length 434 of the front reinforcement portion 424. In another embodiment, each of the first and second side reinforcement portions 420, 422 and the front and rear reinforcement portions 424, 426 may include notches 446 defined therein, the notches 446 being spaced along their respective lengths of each of the first, second, front and rear reinforcement portions 420, 422, 424, 426. Similar to the notches 412 of the first and second diagonal reinforcement portions 398, 400, the notches 446 of the first, second, front and rear reinforcement portions 420, 422, 424, 426 may facilitate heat to flow rearward along the underside surface 356 of the griddle 350 since there may not be a rib along the rear end 360, and the first and second side ribs 376, 378 may be solid and the front rib 380 may be mostly solid, but for the viewing holes 396 defined in the front rib 380.

Figure 27:
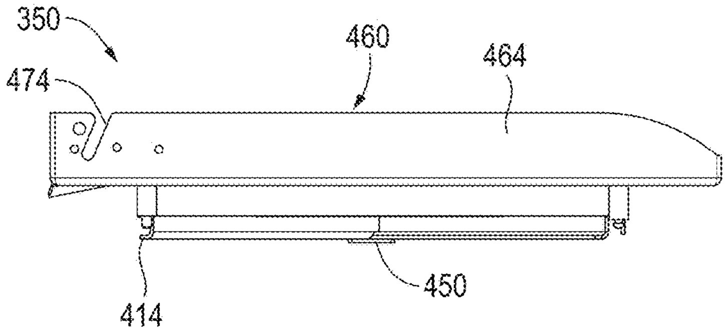
FIG. 27 is a left side view of the griddle of FIG. 20, according to another embodiment of the present invention.
Figure 28:
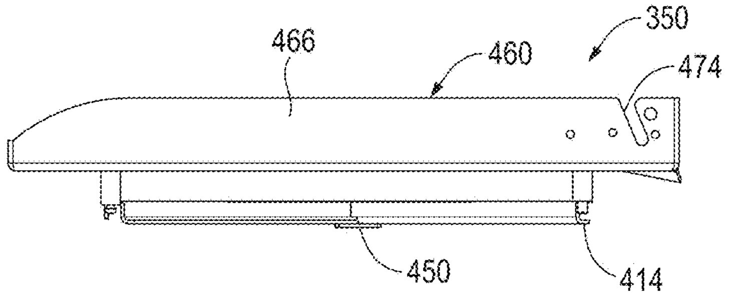
FIG. 28 is a right side view of the griddle of FIG. 20, according to another embodiment of the present invention.

Further, in another embodiment, the reinforcement structure along an underside of the griddle 350 may include a central plate 450. The central plate 450 may be positioned over an intersection 452 of the first and second diagonal reinforcement portions 395, 400. The central plate 450 may be flat to define opposing flat surfaces such that one flat surface 454 may face away from the underside surface 356 and the other flat surface (not shown) may face the underside surface 356 of the griddle 350. In another embodiment, the central plate 450 may define a square or rectangular periphery. In another embodiment, the central plate 450 may be positioned over the intersection 452 of the first and second diagonal reinforcement portions 398, 400 such that the opposing flat surfaces may extend parallel relative to the underside surface 356 of the griddle 350. Such central plate 450 may be fixedly coupled to the intersection 452 of the first and second diagonal reinforcement portions 398, 400 with, for example, welds at a hole 456 defined in the central plate 450 at the intersection 452 and welds at, for example, each corner 458 of the central plate 450. The welds at each corner may be welds between the corresponding corner 458 and a portion of the second side 410 of one of the first and second diagonal reinforcement portions 398, 400. As depicted in FIGS. 27 and 28, the central plate 450 may be a lower most portion of the reinforcement structure and, further, a lower most portion of the griddle 350.

Figure 25:
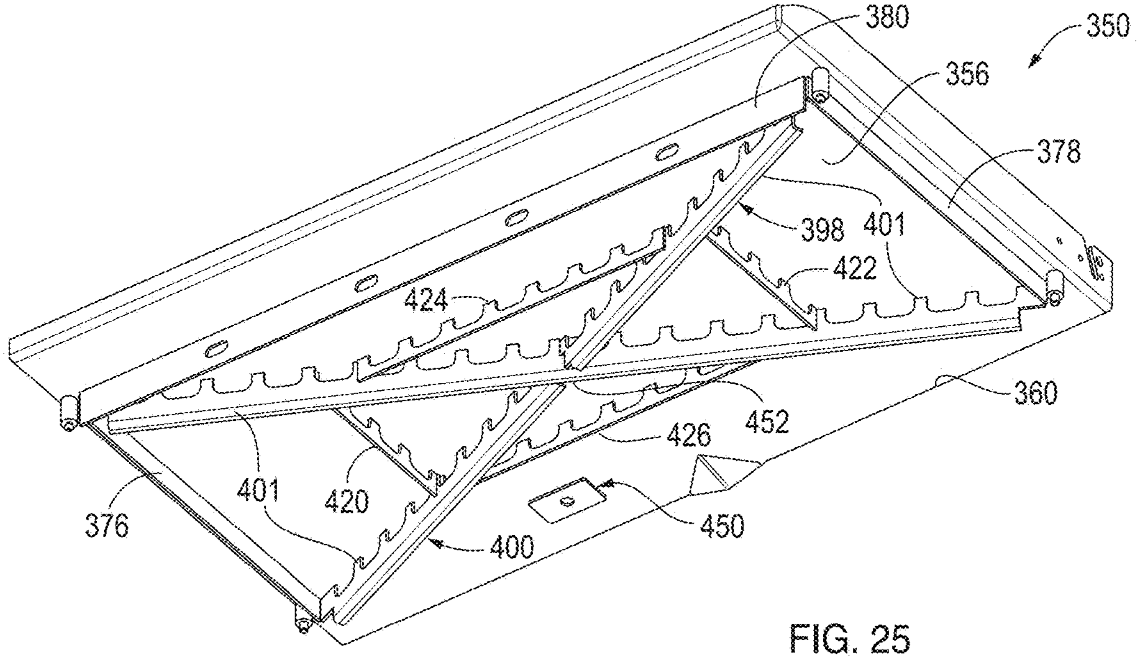
FIG. 25 is a bottom perspective view of the griddle of FIG. 20, depicting a plate detached from underside components of the griddle, according to another embodiment of the present invention.
Figure 26:
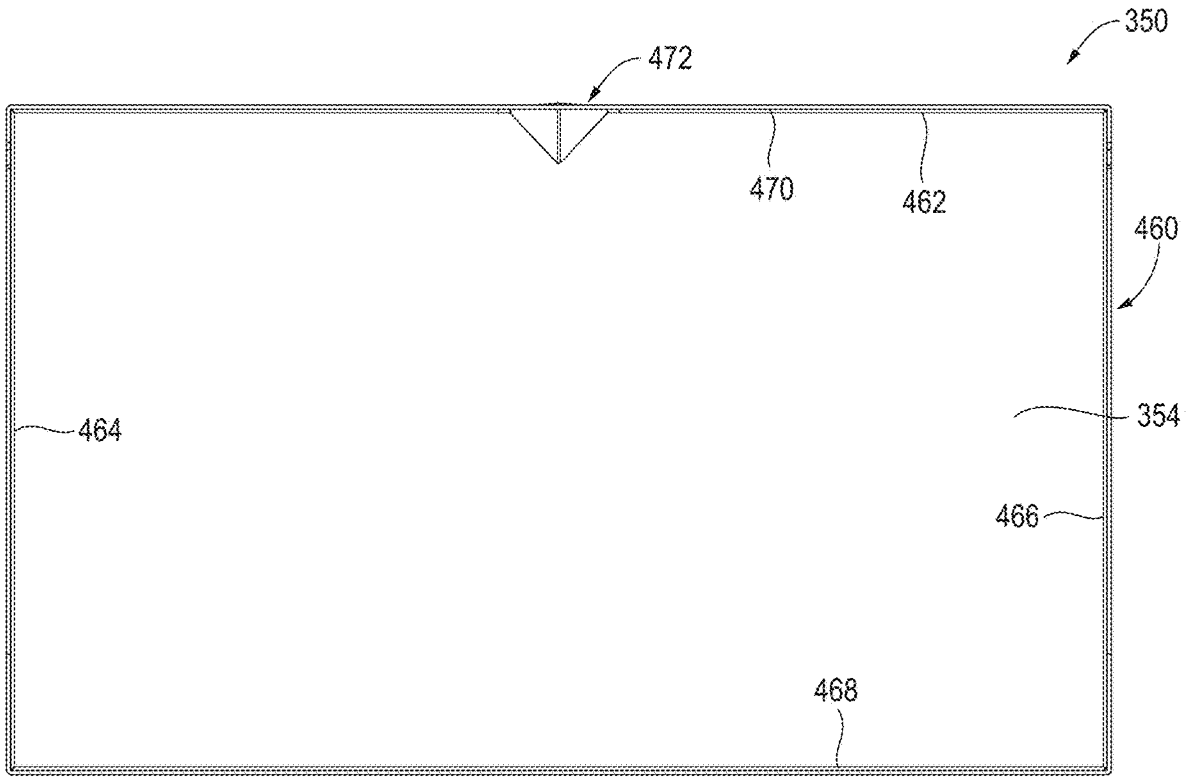
FIG. 26 is a top view of the griddle of FIG. 20, according to another embodiment of the present invention.

With reference now to FIGS. 21, 24 and 25, one method of forming the understructure of the griddle 350 is provided. For example, in one embodiment, the front rib 380 may first be positioned and fixed to the underside surface 356 and then the first and second side ribs 376, 378 may be positioned to be perpendicular and extend from ends of the front rib 380 toward the rear end 360 of the griddle 350. Upon the ribs being positioned along the underside surface of the griddle 350, the reinforcement structure may be positioned to the underside surface 356 of the griddle 350. The first and second diagonal reinforcement portions 398, 400 may then be positioned and fixed to the underside surface 356 to form the x-configuration along the underside surface 356 of the griddle 350 such that ends of the diagonal portions 401 may be coupled to opposing ends of the first and second side ribs 376, 378, as best shown in FIG. 21. The first and second side reinforcement portions 420, 422 may then be positioned between adjacently extending diagonal portions 401 of the first and second diagonal reinforcement portions 398, 400 such that the first and second side reinforcement portions 420, 422 extend parallel relative to each other. Similarly, the front and rear reinforcement portions 424, 426 may then be positioned between adjacently extending diagonal portions 401 of the first and second diagonal reinforcement portions 398, 400 so that the front and rear reinforcement portions 424, 426 extend parallel relative to each other. The central plate 450 may then be placed over the intersection 452 of the first and second diagonal reinforcement portions 398, 400. Such placement of the various components of the reinforcement structure and the ribs may be fixed to each other and the underside surface 356 of the griddle 350 via welding, as known to one of ordinary skill in the art. With this arrangement, the central plate 450 may be positioned and welded over the juncture of the first and second diagonal reinforcement portions 398, 400 to further strengthen and stabilize the diagonal reinforcement portions relative to the griddle 350.

Now with reference to FIGS. 22, 23, and 26-28, an upper side of the griddle 350 may include various structural features, similar to that discussed in previous embodiments, such as a splash guard 460 for managing grease. For example, the splash guard 460 may extend upward from the cooking surface 354 so as to extend along a periphery 462 of the cooking surface 354 to define first and second splash guards 464, 466, a front splash guard 468 and a rear splash guard 470. Further, the splash guard 460 may at least partially define an opening, such as a rear opening 472, for managing food biproduct and grease, such that a grease cup (not shown) may be positioned below the rear opening 472 for capturing grease draining therefrom. Similar features for managing grease from cooking on a griddle are disclosed in commonly assigned U.S. patent application Ser. No. 17/214,815, filed on Mar. 27, 2021, entitled "OUTDOOR COOKING STATION WITH GRIDDLE, SYSTEM AND METHOD THEREOF," the disclosure of which is incorporated herein in its entirety. Further, the first and second side splash guards 466, 468 (or the rear splash guard 470) may each include a channel 474 or opening defined therein, the channel 474 or opening may be sized and configured for receiving a hood (not shown) within the channel or opening to pivot between open and closed positions relative to the griddle 350. Similar features that may involve the channel 474 or a hood associated with a griddle are disclosed in commonly assigned U.S. patent application Ser. No. 17/227,219, filed on Apr. 9, 2021, entitled "GRIDDLE COOKING STATION WITH HOOD AND METHOD THEREOF," the disclosure of which is incorporated herein in its entirety.

Figure 29:
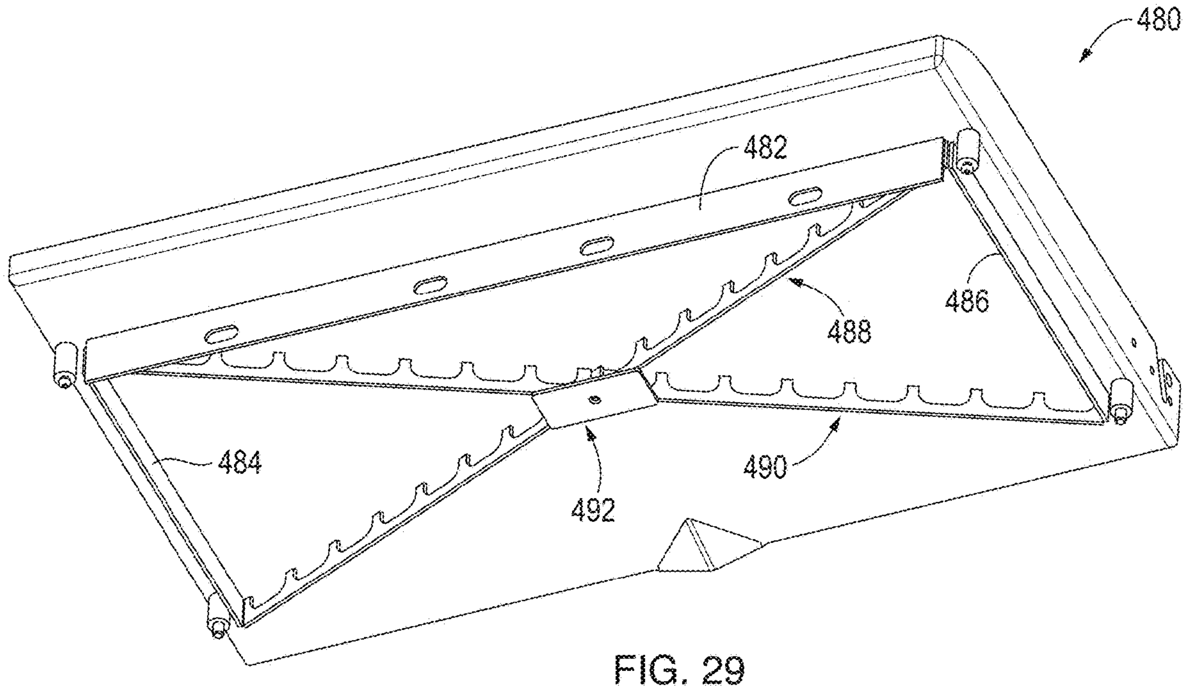
FIG. 29 is a bottom perspective view of another embodiment of a griddle, according to the present invention.
Figure 30:
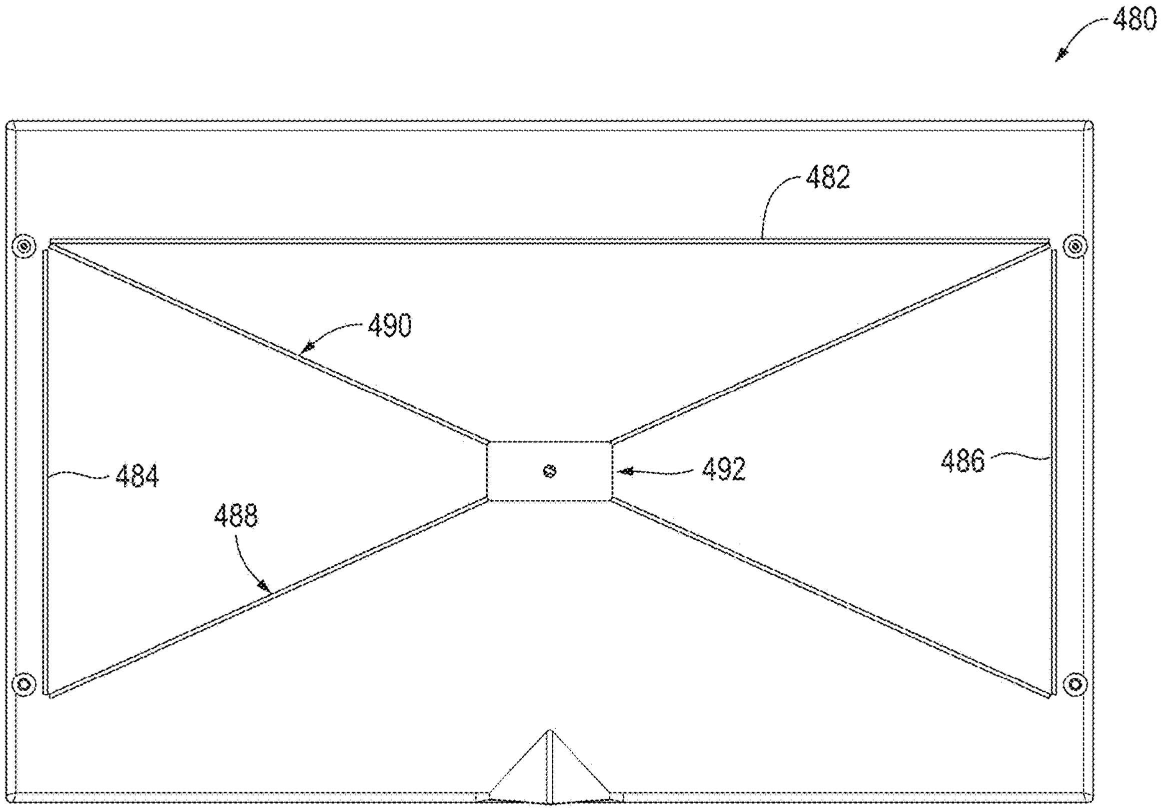
FIG. 30 is a bottom view of the griddle of FIG. 29, according to another embodiment of the present invention.

With reference to FIGS. 29 and 30, another embodiment of a griddle 480 similar to the previous embodiment is provided. In this embodiment, instead of the griddle 480 having the first, second, front and rear reinforcement portions 420, 422, 424, 426 of the previous embodiment (see FIG. 21), the griddle 480 may include a front rib 482, and first and second ribs 484, 486 for blocking cross-wind air flow and channeling heat toward the rear side of the griddle 480, similar to that described in the previous embodiment. Further, the griddle 480 may include the first and second diagonal reinforcement portions 488, 490 with a central plate 492 positioned and secured to an intersection of the first and second diagonal reinforcement portions 488, 490 such that the first and second diagonal reinforcement portions 488, 490 may be positioned to exhibit an x-configuration. In this embodiment, the first and second diagonal reinforcement portions 488, 490 may not include the lateral flange, set forth in the previous embodiment. In this embodiment, the first and second diagonal reinforcement portions 488, 490 may extend with a longitudinal length, a height and thickness similar to previous embodiments set forth herein (without the lateral flange).

With reference again to the embodiment described in FIGS. 19 and 20 (and any other of the griddle embodiments set forth herein), the griddle 350 provides multiple benefits and increased efficiencies due to one or more of the structural features of the understructure, as set forth herein. For example, the various components of the reinforcement structure increase the structural integrity of the flat plate 352 of the griddle 350 and, thus, the griddle 350 has the structural characteristics to better withstand the effects of thermal stress and strain placed on the griddle 350 over many uses over a long period of time. As such, due to the components of the understructure, the griddle 350 may be formed with a minimized amount of material so that the griddle may be lighter, in comparison to typical griddles. In another embodiment, the flat plate 352 of the griddle 350 may be formed thinner due to the various reinforcement components such that the flat plate 352 may be formed with a thickness of about 3.5 millimeters and still maintain its structural integrity to withstand the effects of thermal stress and strain. Further, due to the configuration of the reinforcement portions, such as the x-configuration (and other reinforcement components) and/or the ribs that may act as a windshield and control the direction of the heat flow, the flat plate 352 of the griddle may become sufficiently heated quicker and may burn hotter than typical griddles. This may further be the case due to the flat plate 352 of the griddle 350 being formed thinner in comparison to typical griddles. As such, the various embodiments of the understructure for a griddle set forth herein may allow for decreasing the amount of fuel needed to effectively heat the griddle. In this manner, the understructure of the various griddles set forth herein may minimize fuel costs and may minimize the material (and thus the weight) needed to make and form the griddle, which also may minimize the cost for manufacturing the griddle.

Figure 31:
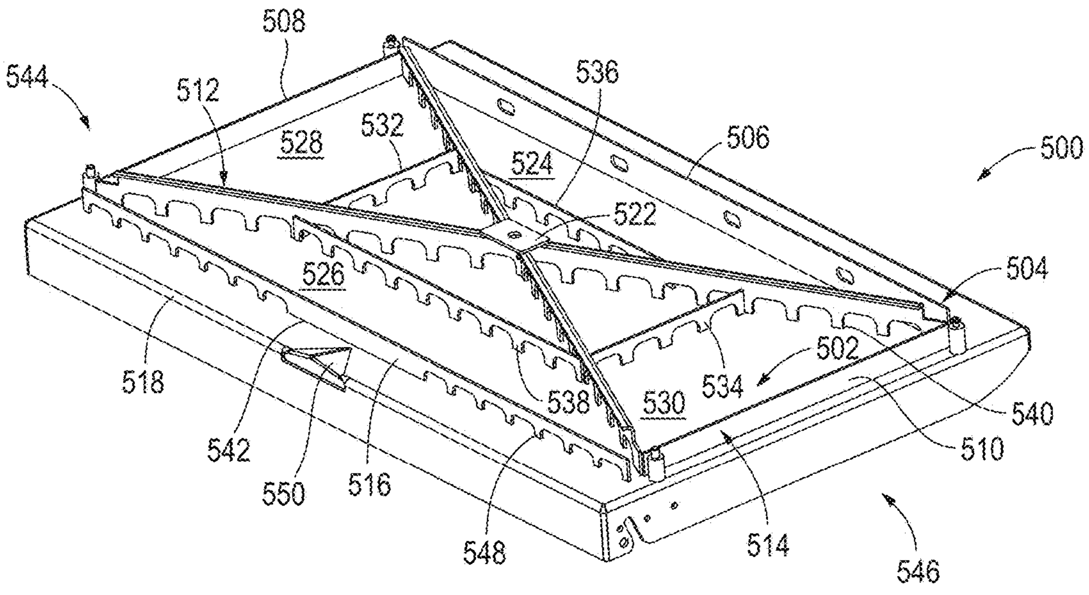
FIG. 31 is a perspective view of another embodiment of a griddle with a reinforcement structure, according to the present invention.
Figure 32:
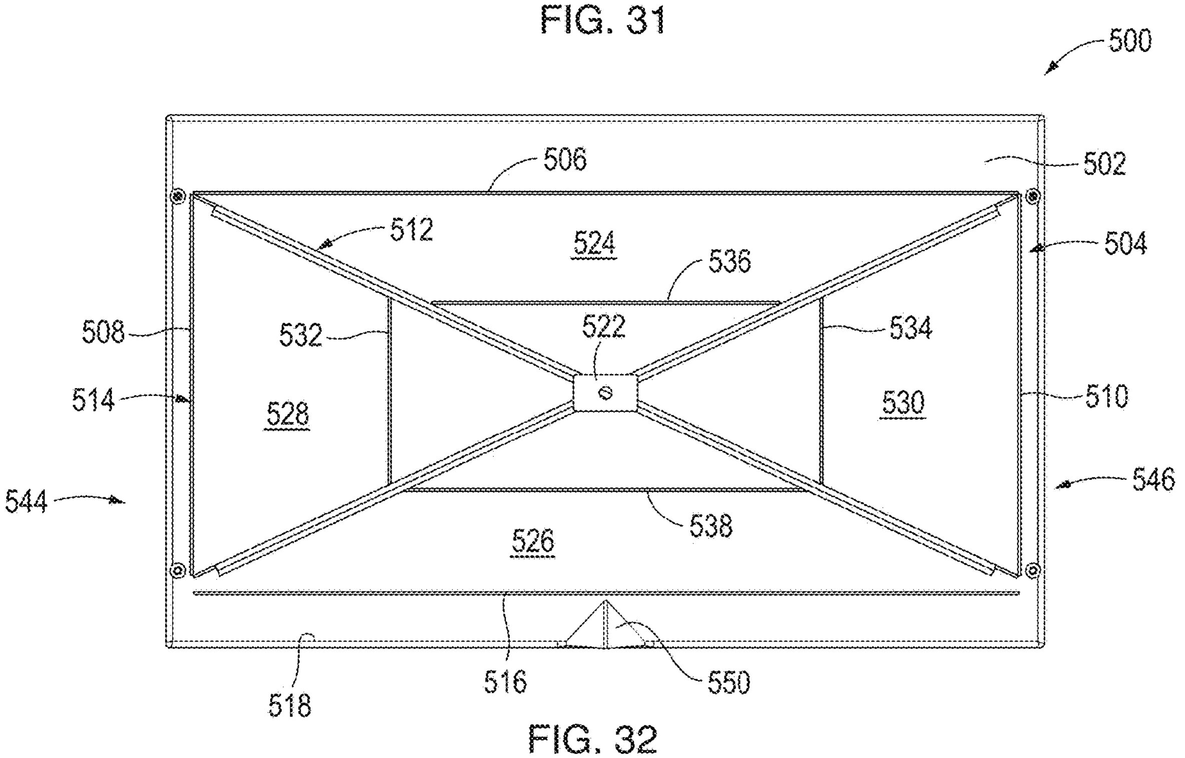
FIG. 32 is a bottom view of the griddle of FIG. 31, depicting the reinforcement structure secured thereto, according to another embodiment of the present invention.
Figure 33:
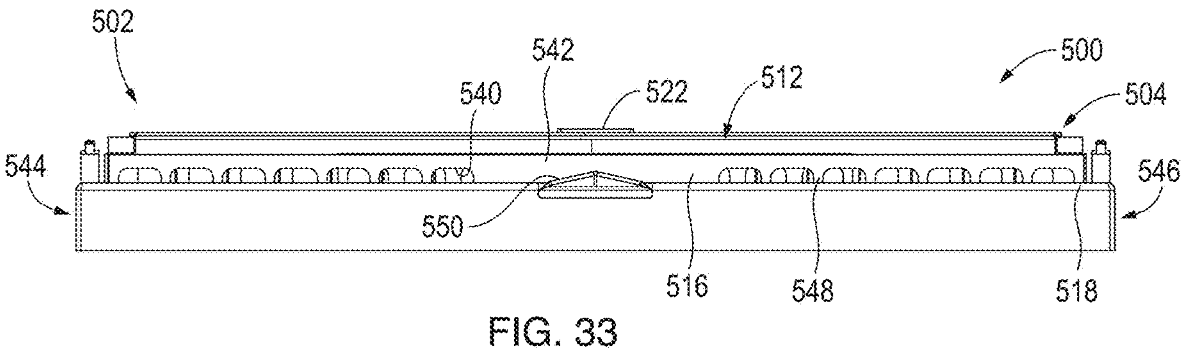
FIG. 33 is a rear view of the griddle of FIG. 31, according to another embodiment of the present invention.
Figure 34:
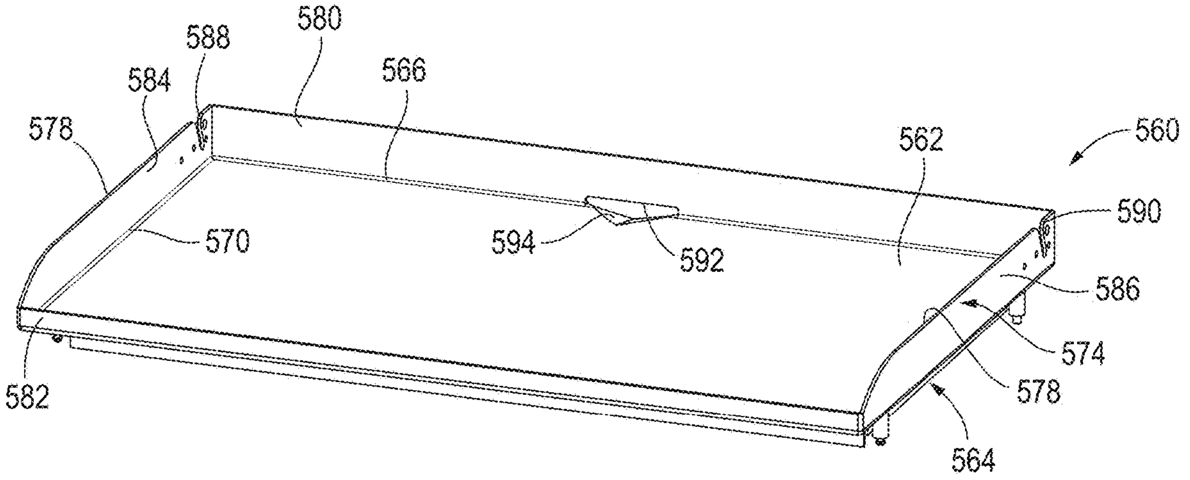
FIG. 34 is a perspective view of another embodiment of a griddle, according to the present invention.
Figure 35:
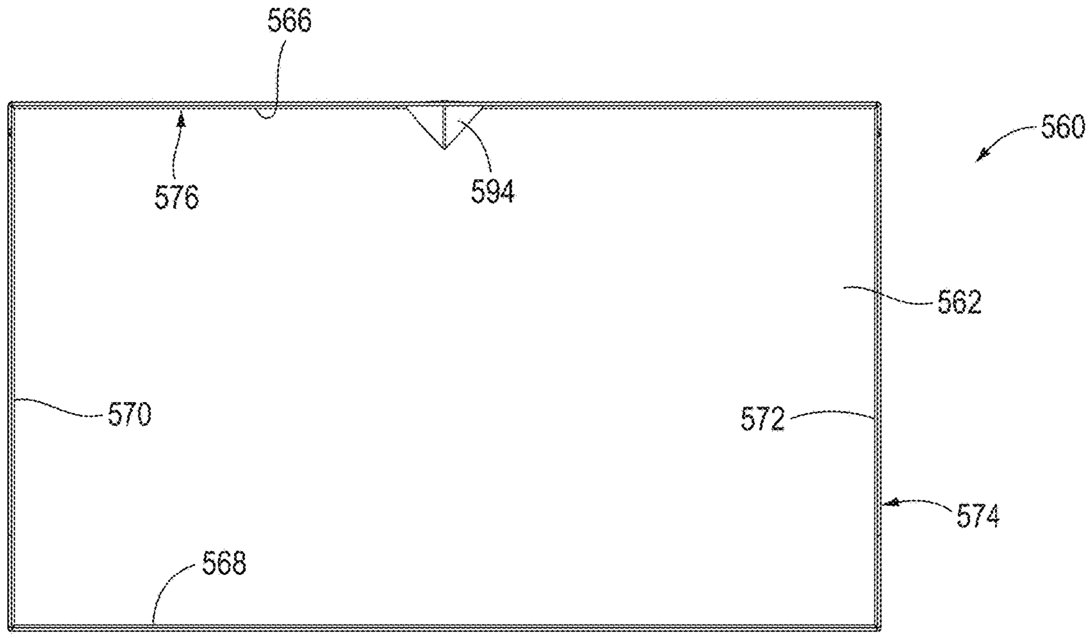
FIG. 35 is a top view of the griddle of FIG. 34, according to another embodiment of the present invention.
Figure 36:
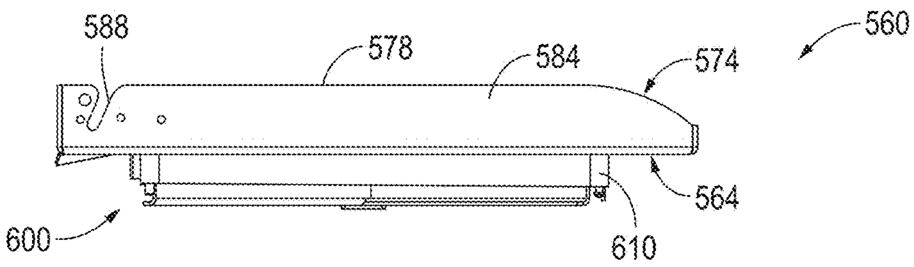
FIG. 36 is a left side view of the griddle of FIG. 34, according to another embodiment of the present invention.
Figure 37:
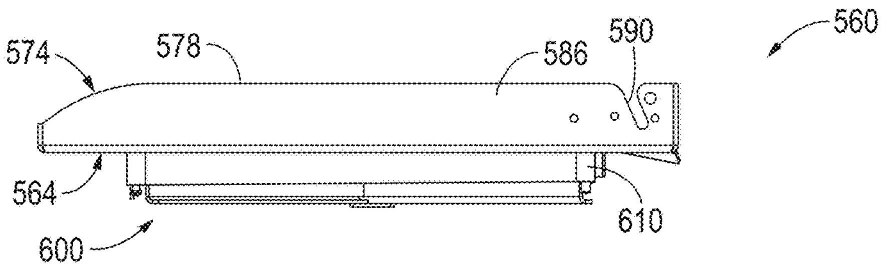
FIG. 37 is a right side view of the griddle of FIG. 34, according to another embodiment of the present invention.

Now, with reference to FIGS. 31-33, another embodiment of a griddle 500 with similar components of the previous embodiments is provided. The griddle 500 may have an underside surface 502 extending to define a reinforcement structure 504. The reinforcement structure 504 may include similar structures as provided in the previous embodiments, such as, a front support structure 506, left support structure 508, right support structure 510, and diagonal support structures 512, where the left and right support structures 508, 510 may also be referenced as side support structures 514. The reinforcement structure 504 may be sized and configured to add to the rigidity and integrity of the griddle 500 as the griddle 500 may undergo thermal stress and strain. Further, the reinforcement structure 504 may also include a rear structure 516 extending along the length of a rear end periphery 518 of the underside surface 502 of the griddle 500. The rear structure 516 may be integrally formed to the underside surface 502 of the griddle 500. In one embodiment, the rear structure 516 may be separate from the reinforcement structure 504. In another embodiment, the rear structure 516 may be integrally coupled to the reinforcement structure 504 where the rear structure 516 may be coupled to the diagonal support structures 512 and side support structures 514. Further, the rear structure 516 may be sized and configured to act as a wind guard such that the rear structure may block some of any potential wind from entering between the underside surface 502 of the griddle 500 and a main body along a rear side of a cooking station 10 (see FIG. 1).

Similar to the previous embodiments, the diagonal support structures 512 may extend to an intersection point 522 and define a front region 524, a rear region 526, a left region 528, and a right region 530. The front region 524 extending from the intersection point 522 to the front support structure 506, the rear region 526 extending from the intersection point 522 to the rear structure 516, and the left and right regions 528, 530 extending from the intersection point 522 to the left and right support structures 508, 510 respectively. Further, as provided in previous embodiments, the reinforcement structure 504 may also include a first reinforcement portion 532, a second reinforcement portion 534, a front reinforcement portion 536, and a rear reinforcement portion 538. The first, second, front, and rear reinforcement portions 532, 534, 536, 538 may be coupled to the diagonal support structures 512 and are sized and configured to provide further structure to the griddle 500.

Now, the side support structures 514 and/or diagonal support structures 512 may include vents 540 therein and extending along the lengths of the side support structures 514 and diagonal support structures 512, similar to the previous embodiments discussed herein. The vents 540 may be sized and configured to facilitate air flow therethrough and direct air flow from out of the underside surface 502 of the griddle 500. For example, the vents 540 may allow heated air to move from the left and right regions 538, 530 toward the rear region 526. The vents 540 may also extend along the length of the first and second reinforcement portions 532, 534, the front reinforcement portion 536, and the rear reinforcement portion 538. The front support structure 506 may be substantially continuous such that no vents 540 are positioned thereon and may block the heated air from escaping towards the user. The rear structure 516 may include the vents 540 extending along the length of the rear structure 516 such that air flow from the front, rear, left, and right regions 524, 526, 528, 530 may flow towards the vents 540 positioned on the rear structure 516 and out from the underside surface 502 of the griddle 500 away from the user. Further, the rear structure 516 may extend to include a solid portion 542 extending a substantial portion of the length of the rear structure 516. The solid portion 542 may be positioned behind a grease trough 550 and may be positioned along a central region of the length of the rear structure 516 such that the vents 540 positioned on the rear structure 516 may be separated by the solid portion 542 where the vents 540 may extend from a left side 544 of the griddle 500 to the solid portion 542 and from a right side 546 of the griddle 500 to the solid portion 542. The vents 540 may be spaced relative to each other to define a flat portion 548 between adjacent spaced vents 540, where the flat portion 548 may be positioned against the underside surface 502 of the griddle 500.

As previously set forth, the rear structure 516 may be sized and configured to minimize the effects of windy conditions to assist in preventing air flow from entering between the underside surface 502 of the griddle 500 and the main body of the cooking station 10 (FIG. 1). In previous embodiments, the rear structure 516 may not be included, allowing for heat to escape the underside surface 502 of the griddle 500 or out the left and right support structures 508, 510 when vents 540 are present. The vents 540 positioned along the rear structure 516 of the griddle 500 allow for the heat to escape the underside surface 502 of the griddle 500 while the flat portion 548 of the vents 540 and the solid portion 542 of the rear structure 516 substantially block wind from entering the underside surface 502 of the griddle 500. Further, the left and right support structures 508, 510 may not include vents 540 such that the heated air is directed towards the rear structure 516. The solid portion 542 may be positioned on the rear structure 516 such that when heated air flows to the solid portion 542, the solid portion 542 may assist in pushing the heated air towards the vents 540 positioned along the rear structure 516.

Now with reference to FIGS. 34-41, another embodiment of a griddle 560 is provided. This embodiment of the griddle may include a variation of a rear support structure along an underside of the griddle 560 that may define vents therein along most or an entire length of the rear support structure (see FIG. 41). Further, the griddle 560 may be sized and configured to be positioned over a main body of a cooking station, similar to the cooking stations described and depicted relative to FIGS. 1 and 16. Further, as will be readily appreciated by one of ordinary skill in the art, the griddle 560 may also be readily employed with an insert type cooking station or outdoor cooking stations that fit within outdoor counter-top structures. The griddle 560 of this embodiment may include similar structural features to that described in previous embodiments and, therefore, the description for similar features and structure of the previous embodiments of a griddle may apply to the griddle 560 of this embodiment.

With reference to FIGS. 34-39, the griddle 560 may include a cooking surface 562 and an underside surface 564, the cooking surface 562 configured to face upward and the underside surface 564 configured to face downward. The cooking surface 562 may extend between a rear end 566 and a front end 568 as well as left end 570 and a right end 572 so as to define a generally square shaped or rectangular shaped cooking surface 562. As such, the rear end 566 may be substantially parallel with the front end 568 of the cooking surface 562, and the left end 570 may be substantially parallel with the right end 572 of the cooking surface 562. The cooking surface 562 may be a flat griddle type cooking surface.

The cooking surface 562 may include a splash guard 574 extending upward from the ends of the cooking surface 562. As such, the splash guard 574 may extend upward from a periphery 576 of the cooking surface 562. The splash guard 574 may extend upward to define a top edge 578 of the splash guard 574. Such splash guard 574 may include a rear splash guard 580, a front splash guard 582, a left splash guard 584 and a right splash guard 586 each of which may longitudinally extend upward along a length of the respective rear end 566, front end 568, left end 570, and right end 572 of the cooking surface 562. In one embodiment, each of the rear, front, left and right splash guards 580, 582, 584, 586 may extend substantially perpendicular relative to the flat cooking surface 562. In another embodiment, the rear splash guard 580 may extend higher than the front splash guard 582. In another embodiment, the top edge 578 of the left and right splash guards 584, 586 that may slope downward at least partially along the length of the left and right splash guards 584, 586. Such downward slope may change a height of the left and right splash guards 584, 586 along a length thereof so that the left and right splash guards 584, 586 may slope to a height of the front splash guard 582. Further, the left and right splash guards 584, 586 may include left and right slots 588, 590 defined therein. Such left and right slots 588, 590 may be sized and configured to receive pins associated with a griddle hood, similar to that previously described herein.

The griddle 560 may also include an opening 592 defined therein that may be sized and configured to drain grease therethrough so that grease may drain from the cooking surface 562, as described in other embodiments herein. The opening 592 may be referenced as a grease drain opening. The opening 592 may at least partially be defined in the splash guard 574 and/or the cooking surface 562 of the griddle 560. The griddle 560 may also include a slope 594 that depends directly from the cooking surface 562 to assist draining grease from the griddle 560. In another embodiment, the opening 592 for draining grease may be defined in the cooking surface 562 at a position adjacent to or set back from the splash guard 574, such as any one of the rear, front, left and right splash guards 580, 582, 584, 586.

Now with reference to FIGS. 36-41, the underside surface 564 and the components associated with the underside surface 564 will now be described. The underside surface 564 may extend to an underside periphery 596, which may extend to define the bounds of the underside surface 564. For example, the underside surface 564 may extend to define a rear underside end 598, a front underside end 602, a left underside end 604 and a right underside end 606. The rear underside end 598 may extend parallel relative to the front underside end 602, and the left underside end 604 may extend parallel relative to the right underside end 606. Further, the rear, front, left and right underside ends 598, 602, 604, 606 of the underside surface 564 may correspond with and be oppositely positioned relative to the respective front, rear, left and right ends 566, 568, 570, 572 of the cooking surface 562. The underside surface 564 of the griddle 560 may include griddle legs 610, such as four legs. For example, two left side griddle legs may be positioned adjacent the left underside end 604 of the underside surface 564 of the griddle 560 and two right side griddle legs may be positioned adjacent the right underside end 606 of the underside surface 564 of the griddle 560. Such griddle legs 610 may correspond with and be held and supported within holes 160 defined in an upper surface of the main body 13 of the cooking station 10, as previously described (see FIG. 2).

Furthermore, as in previous embodiments, the underside surface 564 may include an understructure 600 coupled thereto. In one embodiment, the understructure 600 may be sized and configured to minimize warping of the griddle 560. In another embodiment, the understructure 600 may be sized and configured to minimize air flow, such as wind, from moving below the griddle 560. In another embodiment, the understructure 600 may be sized and configured to control movement of the convective heat that may heat the griddle 560. In another embodiment, the understructure 600 may include a reinforcement structure 612 and a windshield structure 614.

Figure 40:
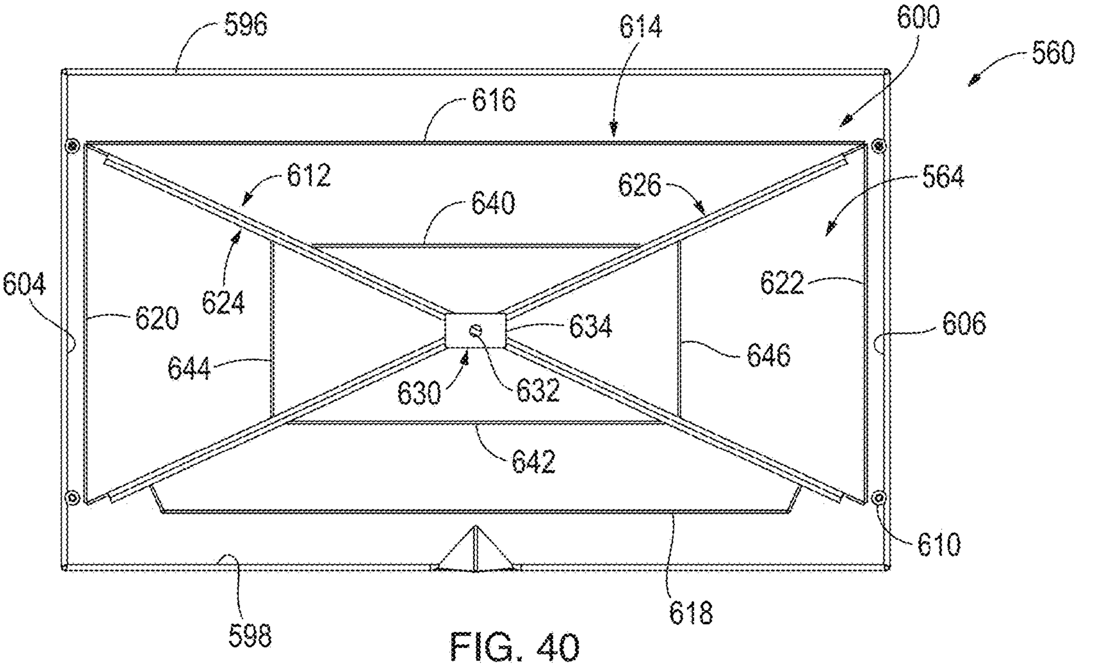
FIG. 40 is a bottom view of the griddle of FIG. 34, according to another embodiment of the present invention.
Figure 41:
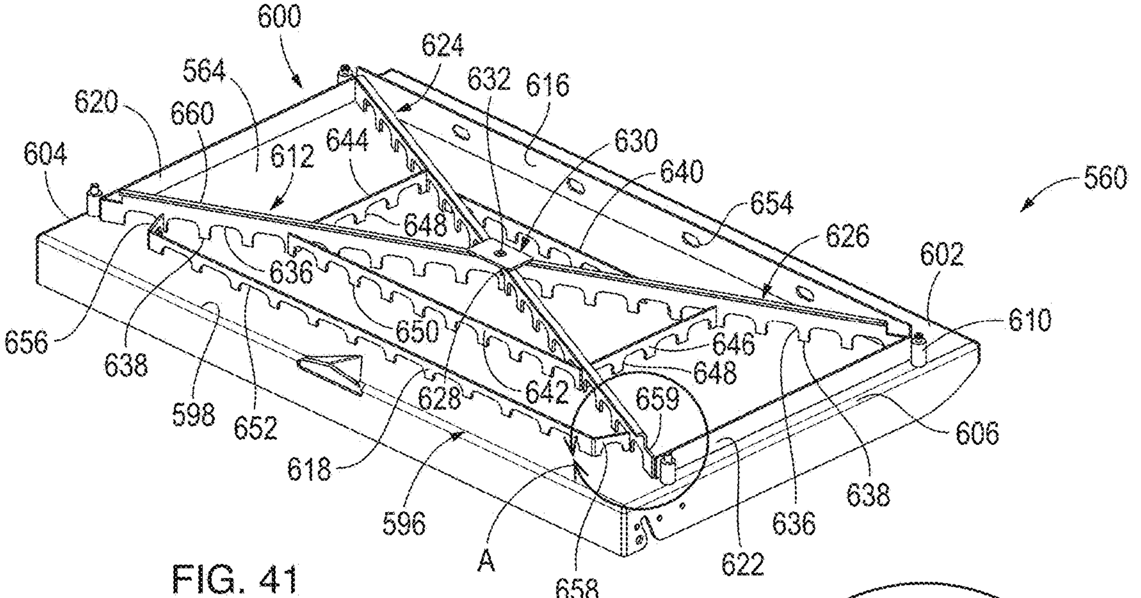
FIG. 41 is a perspective bottom view of the griddle of FIG. 34, according to another embodiment of the present invention.

With reference to FIGS. 40 and 41, similar to previous embodiments, the reinforcement structure 612 coupled to the underside surface 564 may include multiple components, such as a front support structure 616, a rear support structure 618, a left support structure 620, and a right support structure 622, which may be positioned along and correspond with the respective rear, front, left and right underside ends 598, 602, 604, 606. The front support structure 616 may be positioned to be set back from the front underside end 602 a further distance than the position of the left and right support structures 604, 606 are relative to the left and right underside ends 604, 606. The reinforcement structure 612 may also include first and second diagonal reinforcement structures 624, 626 that may extend diagonally across the underside surface 564 of the griddle 560 to exhibit an x-configuration. Such first and second diagonal reinforcement structures 624, 626 may be referenced as first and second diagonal support structures. The first and second diagonal reinforcement structures 624, 626 may cross each other or exhibit an intersection, or central intersection 628 of the x-configuration. Such reinforcement structure 612 may also include a central plate 630. The central plate 630 may be positioned over a region or portions of the first and second diagonal reinforcement structures 624, 626 adjacent the central intersection 628. The central plate 630 may include a plate opening 632 centrally located in the central plate 630 and may include a plate periphery 634. The central plate 630 may be positioned over the central intersection 628 so that the plate opening 632 may be centered over the joints of the first and second diagonal reinforcement structures 624, 626. With such positioning of the central plate 630, welds may be received through the plate opening 632 to weld the joints and weld the central plate 630 to structure adjacent the joints. Additional welds may be added between the plate periphery 634 and each of the first and second diagonal reinforcement structures 624, 626 on both sides of the central plate 630. The first and second diagonal reinforcement structures 624, 626 may each extend, and be coupled to (welded), front and rear ends of the left and right support structures 620, 622. Further, the first and second diagonal reinforcement structures 624, 626 may include vent openings 636 therein with engagement portions or engagement ends 638. The engagement ends 638 may directly engage the underside surface 564 of the griddle 560 and may be welded thereto. The vent openings 636 defined in the first and second diagonal reinforcement structures 624, 626 facilitate convective heat moving freely through the first and second diagonal reinforcement structures 624, 626. With this arrangement, the first and second diagonal reinforcement structures 624, 626 may extend transverse relative to each of the front, rear, left and right support structures 616, 618, 620, 622 as well as extending transverse relative to each of the rear, front, left and right underside end 598, 602, 604, 606 of the underside surface 564 of the griddle 560.

In another embodiment, and similar to previous embodiments, the reinforcement structure 612 may include a front reinforcement piece 640, a rear reinforcement piece 642, a left reinforcement piece 644 and a right reinforcement piece 646. The front reinforcement piece 640 may extend substantially parallel relative to the rear reinforcement piece 642. The left reinforcement piece 644 may extend substantially parallel relative to the right reinforcement piece 646. Each of the front, rear, left and right reinforcement pieces 640, 642, 644, 646 may extend to provide a square like profile, as shown in the bottom view of the griddle 560, FIG. 41. Ends of each of the front, rear, left and right reinforcement pieces 640, 642, 644, 646 may be welded to sides of the first and second diagonal reinforcement structures 624, 626. Further, each of the front, rear, left and right reinforcement pieces 640, 642, 644, 646 may include vent openings 648 defined therein with end engagement portions 650 for engaging the underside surface 564 of the griddle 560. Such end engagement portions 650 of each of the front, rear, left and right reinforcement pieces 640, 642, 644, 646 may be welded to the underside surface 564 of the griddle 560 and the vent openings 648 may facilitate air flow through each of the front, rear, left and right reinforcement pieces 640, 642, 644, 646.

With this arrangement, each of the front, rear, left and right reinforcement pieces 640, 642, 644, 646, as well as the first and second diagonal reinforcement structures 624, 626 may facilitate reinforcing the griddle 560 from warping. Further, the front, rear, left and right support structures 616, 618, 620, 622 may also further reinforce the griddle 560 to minimize warping of the griddle 560. The front, rear, left and right support structures 616, 618, 620, 622 may also act as the windshield structure 614. Also, the rear support structure 618 may include rear support openings 652 defined therein such that the rear support openings 652 may be spaced along the length of the rear support structure 618. The left and right support structures 620, 622 may not include openings defined therein and the front support structure 616 may include a minimal amount and size of front openings 654 so that most of the convective heat may be drawn rearward through the rear support openings 652 and then from the rear side of the griddle 560.

Figure 38:
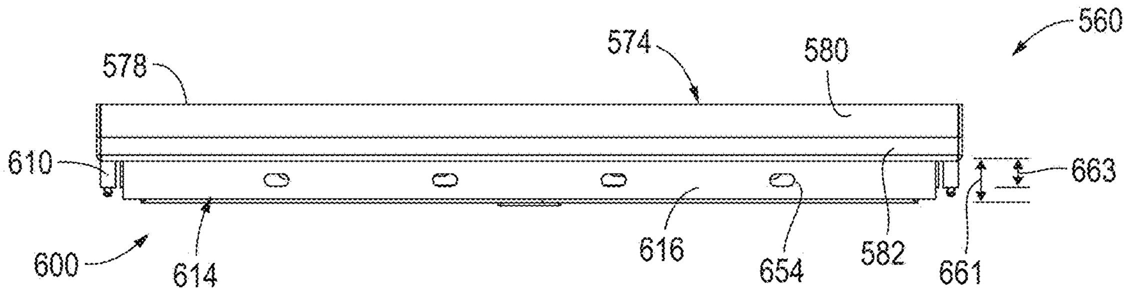
FIG. 38 is a front view of the griddle of FIG. 34, according to another embodiment of the present invention.

With respect to FIG. 38, the front support structure 616 if the griddle 560 may extend with a greater depth than a length of the griddle legs 610. For example, the front support structure 616 may extend downward with a first distance 661, and a base of the griddle legs 610 may extend a first length 663. The first distance 661 of the front support structure 616 may be greater than the first length 663 of the base of the griddle legs 610. As such, with respect to FIGS. 2 and 38, the front support structure 616 may extend below the upper surface or ledge 38 of the main body 13 that holds the griddle legs 610. With such arrangement, the front openings 654 defined in the front support structure 616 remain viewable. Such front openings 654 in the front support structure 616 may be sized and spaced along the length to facilitate a user to view the heating elements 14, such as gas flame burners, so the user can confirm whether the burners are ignited. Further, the front openings 654 defined in the front support structure 616 may be minimized in their size so that, upon heating the griddle 560, the convective heat may substantially be moved rearward so that the front support structure 616 for the most part blocks convective heat from escaping from a front side of the griddle 560.

Figure 39:
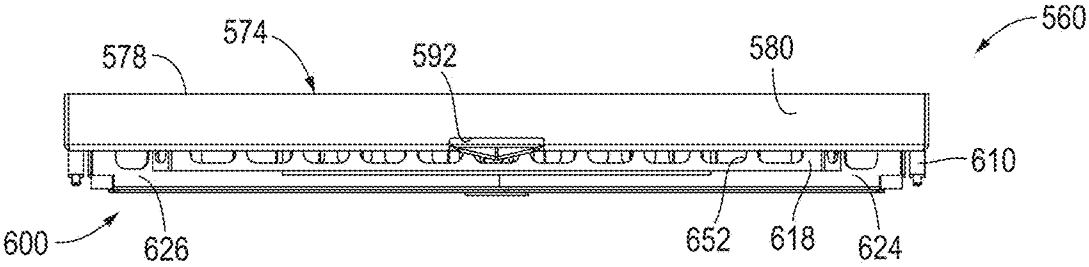
FIG. 39 is a rear view of the griddle of FIG. 34, according to another embodiment of the present invention.

With respect to FIGS. 2, 39 and 41, as previously set forth, the rear support structure 618 of the griddle 560 may extend with rear support openings 652 defined therein. The rear support openings 652 of the rear support structure 618 may be sized and spaced along the length of the rear support structure 618 to facilitate and draw convective heat rearward to pass through the rear support openings 652 of the rear support structure 618. As such, as previously set forth, the left and right support structures 620, 622 do not include openings so that convective heat may be channeled toward the rear support openings 652 of the rear support structure 618. Further, in another embodiment, the rear support structure 618 may include first and second end portions 656, 658. The first and second end portions 656, 658 may extend forward to the respective first and second diagonal reinforcement structures 624, 626. Such forward position of the first and second end portions 656, 658 of the rear support structure 618 may assist in facilitating the positioning of the reinforcement structure 612 within a firebox of the main body 13 since the griddle legs 610 are shorter than the depth of some portions of the reinforcement structure 612. In other words, because the griddle legs 610 are shorter than the depth of portions of the reinforcement structure 612, upon placing the griddle 560 on the main body 13 of a cooking station 10, the reinforcement structure 612 may be configured to extend into the fire box beyond the level of the upper surface that supports the griddle legs 610 and, therefore, portions of the reinforcement structure 612. The first and second diagonal reinforcement structures 624, 626 may include a step structure 659 (see FIG. 41A) adjacent ends of the first and second diagonal reinforcement structures 624, 626. Such step structure 659 may be provided to facilitate fitting the griddle 560 on the main body 13 so that the reinforcement structure 612 does not interfere or engage inner side walls of the fire box (the structure surrounding the heating elements 14) of the cooking station 10.

Figure 41A:
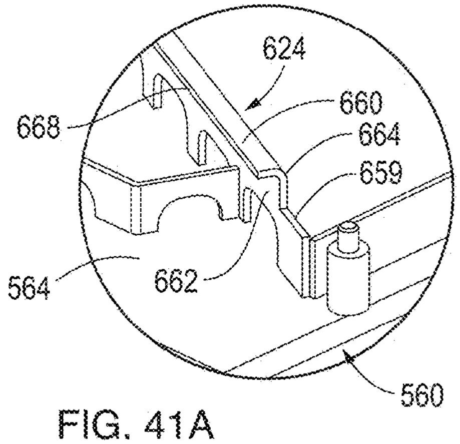
FIG. 41A is an enlarged view of the griddle taken from region A of FIG. 41, according to another embodiment of the present invention.

Now with reference to FIGS. 41 and 41A, in another embodiment, the first and second diagonal reinforcement structures 624, 626 may include a lateral extension 660 at an end portion of each of the first and second diagonal reinforcement structures 624, 626. For example, each of the first and second diagonal reinforcement structures 624, 626 may include a main structure portion 662 that may extend vertically and directly from the underside surface 564 of the griddle 560. The lateral extension 660 may extend laterally and horizontally relative to the vertically extending main structure portion 662 and may extend from a main end 664 of the main structure portion 662 of each of the first and second diagonal reinforcement structures 624, 626. The lateral extension 660 may also extend to a free end 668 of the first and second diagonal reinforcement structures 624, 626. Further, the lateral extension 660 may extend along most or substantially all of the length and along the main end 664 of the main structure portion 662 of each of the first and second diagonal reinforcement structures 624, 626. The lateral extension 660 may further strengthen the structural integrity of the first and second diagonal reinforcement structures 624, 626 to further minimize bending of the first and second diagonal reinforcement structures 624, 626 and further minimize potential warping of the griddle 560.

Figure 42:
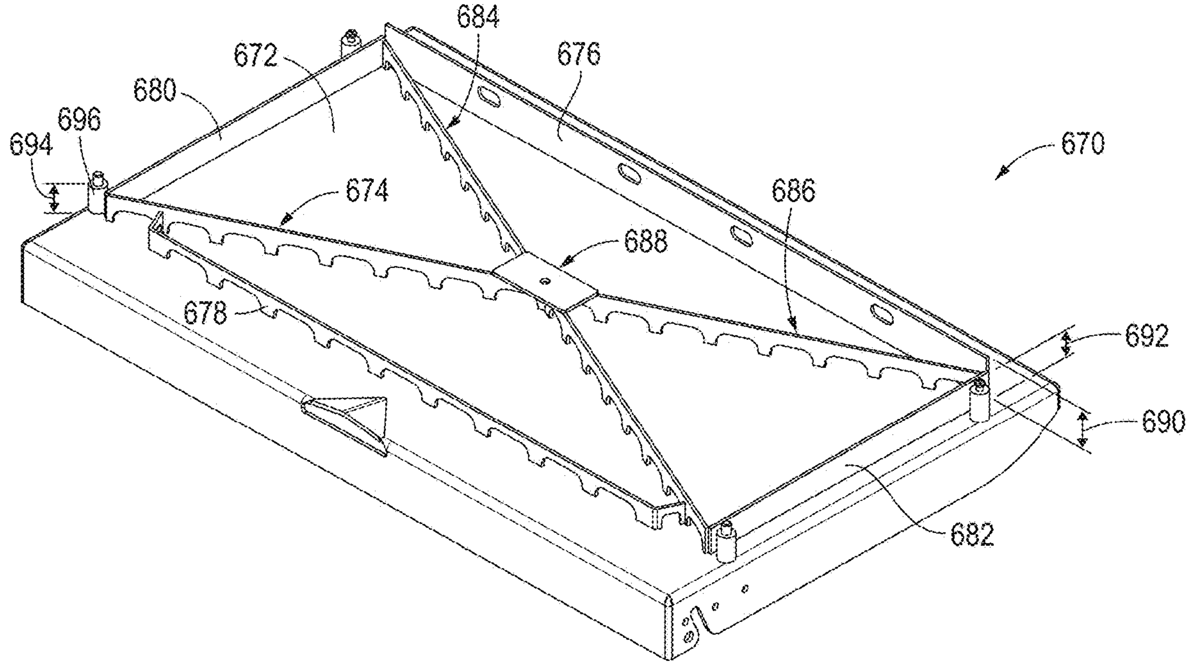
FIG. 42 is a perspective view of another embodiment of a griddle, depicting an underside of the griddle, according to the present invention.

Now with reference to FIG. 42, another embodiment of reinforcement structure 674 coupled to an underside surface 672 of a griddle 670 is provided. This embodiment is substantially similar to the previous embodiment, but may not include the square shaped profile of reinforcement pieces, i.e., front, rear, left and right reinforcement pieces, of the previous embodiment. Rather, the reinforcement structure 674 of this embodiment includes the front, rear left and right support structures 676, 678, 680, 682 as well as the first and second diagonal reinforcement structures 684, 686. In this embodiment, the first and second reinforcement structures 684, 686 may not include the step structure or the lateral extension of the previous embodiment. The first and second diagonal reinforcement structures 684, 686 include a central plate 688 positioned over the central intersection of the first and second diagonal reinforcement structures 684, 686, similar to that described in previous embodiments. Further, in this embodiment, the front support structure 676 extends with a first depth 690 and the remaining components of the reinforcement structure extend with a second depth 692, the first depth 690 being larger than the second depth 692. In one embodiment, the second depth 692 may correspond with a depth 694 of griddle legs 696 of the griddle 670.

Figure 43:
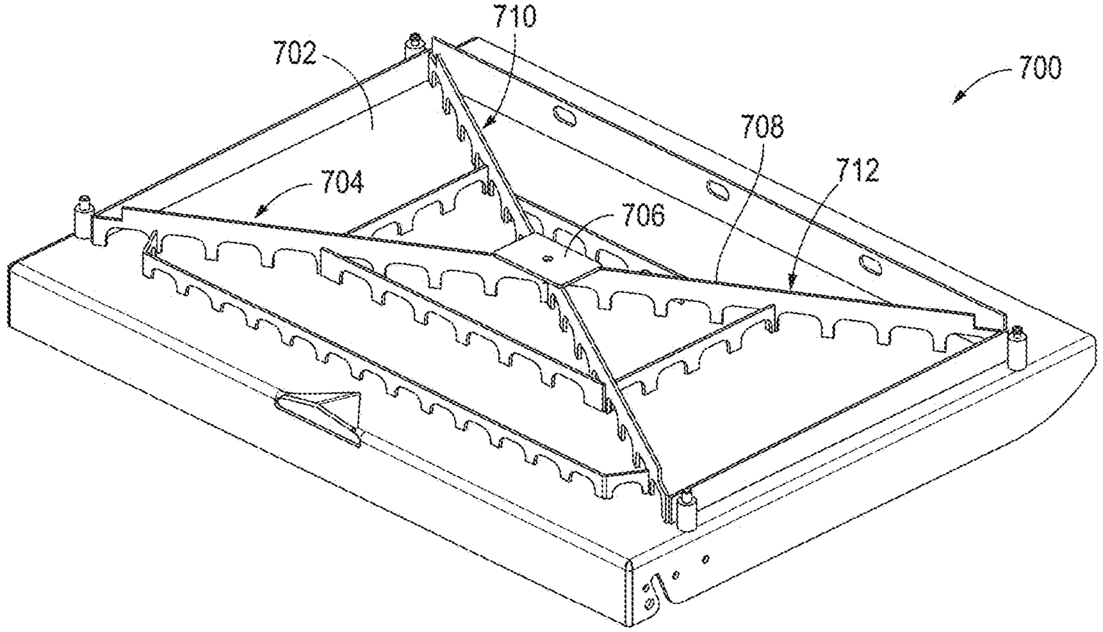
FIG. 43 is a perspective view of another embodiment of a griddle, depicting an underside of the griddle, according to the present invention.

With reference to FIG. 43, another embodiment of reinforcement structure 704 coupled to an underside surface 702 of a griddle 700 is provided. This embodiment of the reinforcement structure 704 of the griddle 700 is substantially similar to the reinforcement structure 704 of the embodiment described and depicted in FIG. 41, except first and second diagonal reinforcement structures 710, 712 of the reinforcement structure 704 of this embodiment do not include the lateral extension depicted in FIG. 41A. As such, similar to previous embodiments, a central plate 706 may be positioned directly over a top edge 708 and central intersection of the first and second diagonal reinforcement structures 710, 712.

The main body of the cooking station and griddle may be formed of metallic materials. For example, various components of the frame may be formed of various steel materials, such as stainless steel or the like, formed with paneling, extensions, cross-members, or any other suitable frame components, and may be coupled together with typical fasteners and/or bolts and the like. Some component of the main body of the cooking station may be various polymeric materials that can withstand high temperatures, as known in the art. The griddle may also be formed from metallic materials, such as, carbon steel, cast iron, stainless steel, or aluminum, or various metal alloys, or any other suitable cooking surface material known in the art, such as porcelain coated materials. The metallic materials may be manufactured using cold rolled steel processes, or hot rolled steel techniques, or any other known manufacturing process, such as casting or stamping, as known in the art. The various plate components of the griddle may include a thickness of 5-6 millimeters, but is not so limited, as such thickness of the various components of the griddle may range, for example, between 3-10 millimeters. Further, the reinforcement structure may be formed from similar metallic materials as the griddle and formed with typical metal cutting techniques and processes and coupled to the underside surface of the griddle with known techniques, such as welding. Also, portions of the griddle, such as the trough and splash guards may be formed by employing cutting and bending techniques from plate material to form the griddle as well as forming portions to the of the griddle with welding techniques, or employing any other known process or techniques to form the griddle, as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking station, comprising:

a main body extending to define a front side, a rear side, a left side and a right side each extending between a lower end and an upper portion, the main body including multiple heating elements supported by the main body and coupled to the upper portion of the main body; and a griddle sized and configured to be removably positioned over and supported by the main body, the griddle including a flat cooking surface and an oppositely facing underside surface, the underside surface extending to define a front end, a rear end, a left end and a right end, the front end extending parallel with the rear end, the left end extending parallel with the right end, the underside surface including diagonal reinforcement portions that extend to exhibit an x-configuration such that the diagonal reinforcement portions extend longitudinally so as to extend transverse along the underside surface relative to each of the front end, the rear end, the left end and the right end of the underside surface of the griddle, the x-configuration defining a central intersection, the central intersection having a central plate coupled directly to the central intersection of the x-configuration.

2. The cooking station of claim 1, wherein the central plate extends substantially parallel with the underside surface of the griddle.

3. The cooking station of claim 1, wherein the central plate comprises a plate opening defined therein, the plate opening of the central plate configured to be positioned over the central intersection.

4. The cooking station of claim 1, wherein the underside surface comprises a front support structure, a left support structure and a right support structure, the front support structure secured to the underside surface and extending parallel with the front end, the left and right support structures secured to the underside surface and extending adjacently along the respective left and right ends, the front support structure including holes defined therein.

5. The cooking station of claim 4, wherein the griddle comprises griddle legs extending from the underside surface of the griddle, the griddle legs configured to directly engage an upper surface of the upper portion of the main body, the griddle legs configured to suspend the underside surface of the griddle above the upper surface of the main body such that the front support structure extends further from the underside surface than the griddle legs so that, upon the griddle being positioned on the main body, the front support structure extends below the upper surface of the main body.

6. The cooking station of claim 4, wherein the holes defined in the front support structure are sized and configured to view the multiple heating elements below the griddle.

7. The cooking station of claim 4, wherein the underside surface comprises a rear support structure with openings defined therein, the rear support structure configured to minimize wind from entering below the griddle and the openings sized and configured to facilitate heat to exit below the griddle.

8. The cooking station of claim 1, wherein the diagonal reinforcement portions extend from the underside surface of the griddle, the diagonal reinforcement portions having a lateral extension adjacent an end of each of the diagonal reinforcement portions.

9. The cooking station of claim 8, wherein the lateral extension extends along most of a length of the diagonal reinforcement portions.

10. The cooking station of claim 1, wherein the griddle comprises a front reinforcement piece, a rear reinforcement piece, a left reinforcement piece, and a right reinforcement piece, each of the front, rear, left and right reinforcement pieces secured to the underside surface of the griddle and positioned between two of the diagonal reinforcement portions, the front and rear reinforcement pieces positioned to extend substantially parallel with both the front and rear ends of the underside surface, the left and right reinforcement pieces positioned to extend substantially parallel with left and right ends of the underside surface.

11. The cooking station of claim 1, wherein the diagonal reinforcement portions each comprise multiple openings defined therein, the multiple openings sized and configured to facilitate convective heat to flow therethrough.

12. A griddle configured to minimize the effects of thermal stress, the griddle comprising:

a flat cooking surface extending to define a periphery and a splash guard, the splash guard extending upward from the periphery of the flat cooking surface; and an underside surface facing opposite of the flat cooking surface, the underside surface extending to define a front end, a rear end, a left end and a right end, the front end extending parallel with the rear end, the left end extending parallel with the right end, the underside surface including diagonal reinforcement portions that extend to exhibit an x-configuration such that the diagonal reinforcement portions extend longitudinally so as to extend transverse along the underside surface relative to each of the front end, the rear end, the left end and the right end of the underside surface of the griddle, the x-configuration defining a central intersection, the central intersection having a central plate coupled directly to the central intersection of the x-configuration.

13. The cooking station of claim 12, wherein the central plate extends substantially parallel with the underside surface of the griddle.

14. The cooking station of claim 12, wherein the central plate comprises a plate opening defined therein, the plate opening of the central plate configured to be positioned over the central intersection.

15. The cooking station of claim 12, wherein the underside surface comprises a front support structure, a left support structure and a right support structure, the front support structure secured to the underside surface and extending parallel with the front end, the left and right support structures secured to the underside surface and extending adjacently along the respective left and right ends, the front support structure including holes defined therein.

16. The cooking station of claim 15, wherein the griddle comprises griddle legs extending from the underside surface of the griddle such that the front support structure extends further from the underside surface than the griddle legs.

17. The cooking station of claim 15, wherein the underside surface comprises a rear support structure with openings defined therein, the rear support structure configured to minimize wind from entering below the griddle and the openings sized and configured to facilitate heat to exit through the openings defined in the rear support structure.

18. The cooking station of claim 12, wherein the diagonal reinforcement portions extend from the underside surface of the griddle, the diagonal reinforcement portions having a lateral extension adjacent an end of each of the diagonal reinforcement portions.

19. The cooking station of claim 18, wherein the lateral extension extends along most of a length of the diagonal reinforcement portions.

20. The cooking station of claim 12, wherein the griddle comprises a front reinforcement piece, a rear reinforcement piece, a left reinforcement piece, and a right reinforcement piece, each of the front, rear, left and right reinforcement pieces secured to the underside surface of the griddle and positioned between two of the diagonal reinforcement portions, the front and rear reinforcement pieces positioned to extend substantially parallel with both the front and rear ends of the underside surface, the left and right reinforcement pieces positioned to extend substantially parallel with left and right ends of the underside surface.

21. The cooking station of claim 12, wherein the diagonal reinforcement portions each comprise multiple openings defined therein, the multiple openings sized and configured to facilitate convective heat to flow therethrough.

22. A method for minimizing effects of thermal stress to a griddle, the method comprising:

positioning a griddle over an upper side of a main body of cooking station such that the griddle includes a cooking surface and an oppositely facing underside surface, the underside surface extending to define a front end, a rear end, a left end and a right end, the front end extending parallel with the rear end, the left end extending parallel with the right end;

igniting one or more heating elements below the griddle and within a base frame of the cooking station; and heating the underside surface of the griddle such that the underside surface of the griddle includes a reinforcement structure directly secured thereto, the reinforcement structure extending to define diagonal reinforcement portions that extend to exhibit an x-configuration so as to define a central intersection of the x-configuration, the central intersection having a central plate coupled over the central intersection of the x-configuration.

23. The method according to claim 22, wherein the heating comprises funneling heat rearwardly along the underside surface of the griddle with a front support structure positioned along the front end and left and right support structures positioned adjacently along the left and right ends, respectively, such that the diagonal reinforcement portions define multiple openings along a length of the diagonal reinforcement portions so that heat moves rearwardly therethrough.

24. The method according to claim 23, further comprising viewing the one or more heating elements through holes defined in the front support structure.

25. The method according to claim 23, wherein the funneling heat rearwardly comprises funneling heat through rear vent openings defined in a rear support structure positioned along the rear end of the underside surface of the griddle.

26. The method according to claim 25, wherein the funneling heat through the rear vent openings comprises blocking wind from flowing between the griddle and the upper side of the main body with the rear support structure along a rear side of the griddle such that the rear vent openings are positioned and sized to facilitate funneling heat from below the griddle so that a remaining structure of the rear support structure sufficiently blocks wind.

27. The method according to claim 23, wherein the funneling heat rearwardly comprises blocking wind from flowing between the griddle and the upper side of the main body with the front support structure along a front side of the griddle, and with the left support structure along a left side of the griddle, and with the right support structure along a right side of the griddle.

28. The method according to claim 22, wherein the heating comprises heating the underside surface of the griddle with the central plate having a plate hole positioned over the central intersection.

* * * * *